(12) United States Patent
Ozugur

(10) Patent No.: US 12,452,313 B2
(45) Date of Patent: Oct. 21, 2025

(54) CYBERTHREAT REMEDIATION USING A ZERO TRUST ENGINE

(71) Applicant: Bank of America Corporation, Charlotte, NC (US)

(72) Inventor: Timucin Ozugur, Fairview, TX (US)

(73) Assignee: Bank of America Corporation, Charlotte, NC (US)

( * ) Notice: Subject to any disclaimer, the term of this patent is extended or adjusted under 35 U.S.C. 154(b) by 106 days.

(21) Appl. No.: 18/582,933

(22) Filed: Feb. 21, 2024

(65) Prior Publication Data

US 2025/0267175 A1    Aug. 21, 2025

(51) Int. Cl.
*H04L 9/40* (2022.01)

(52) U.S. Cl.
CPC ........ *H04L 63/205* (2013.01); *H04L 63/1433* (2013.01); *H04L 63/1441* (2013.01)

(58) Field of Classification Search
CPC .............. H04L 63/205; H04L 63/1433; H04L 63/1441
USPC ............................................................ 726/1
See application file for complete search history.

(56) References Cited

U.S. PATENT DOCUMENTS

| | | | |
|---|---|---|---|
| 10,277,622 B2 | 4/2019 | DiGiambattista et al. | |
| 11,489,863 B1 * | 11/2022 | Shua | G06F 9/45558 |
| 11,616,803 B2 * | 3/2023 | Shua | H04L 63/1433 |
| | | | 726/26 |
| 11,769,577 B1 | 9/2023 | Dods et al. | |
| 11,829,510 B2 | 11/2023 | Dods et al. | |
| 11,848,953 B1 | 12/2023 | Chernick et al. | |
| 11,848,956 B2 * | 12/2023 | Shua | G06F 21/554 |
| 11,888,890 B2 | 1/2024 | Maheve et al. | |
| 2018/0063181 A1 * | 3/2018 | Jones | G06F 21/577 |
| 2020/0068031 A1 * | 2/2020 | Kursun | H04W 24/02 |
| 2021/0273698 A1 | 9/2021 | Ding et al. | |
| 2021/0314338 A1 | 10/2021 | Howe | |
| 2022/0027431 A1 | 1/2022 | Zheng et al. | |
| 2022/0201009 A1 | 6/2022 | Dhoble et al. | |
| 2022/0224724 A1 * | 7/2022 | Bazalgette | H04L 63/1441 |
| 2022/0272117 A1 | 8/2022 | Maheve et al. | |
| 2022/0272119 A1 * | 8/2022 | Camerinesi | G06F 21/53 |
| 2023/0123781 A1 | 4/2023 | Kaimal et al. | |
| 2023/0156032 A1 | 5/2023 | Andriani | |
| 2023/0179613 A1 | 6/2023 | Andrews et al. | |
| 2023/0208828 A1 | 6/2023 | Kolodziej | |
| 2023/0216947 A1 | 7/2023 | Bernardi | |
| 2023/0229787 A1 | 7/2023 | Mahdavipour et al. | |

(Continued)

*Primary Examiner* — Teshome Hailu
(74) *Attorney, Agent, or Firm* — Banner & Witcoff, Ltd.

(57) ABSTRACT

Aspects related to cyberthreat remediation using a zero trust engine are provided. A cyberthreat remediation platform may receive information of cyberthreats and vulnerabilities for application associated with a network. The platform may train a zero trust engine to generate cyberthreat mappings comprising vulnerability-cyberthreat pairings based on the information. The platform may generate a cyberthreat record for an application based on a cyberthreat mapping. The platform may generate a cyberthreat level indicator for the application based on the cyberthreat record. The platform may compare the cyberthreat level indicator to a threshold to identify whether remediation actions should be initiated. Based on the comparison, the platform may initiate one or more remediation actions to resolve one or more cyberthreats.

20 Claims, 11 Drawing Sheets

(56) References Cited

U.S. PATENT DOCUMENTS

| | | |
|---|---|---|
| 2023/0254330 A1 | 8/2023 | Singh et al. |
| 2023/0275917 A1 | 8/2023 | Karmali et al. |
| 2023/0308433 A1 | 9/2023 | Katyal et al. |
| 2023/0336592 A1 | 10/2023 | Narayanaswamy et al. |
| 2023/0353587 A1 | 11/2023 | Bui et al. |
| 2023/0370495 A1 | 11/2023 | Desai et al. |
| 2023/0388278 A1 | 11/2023 | Crabtree et al. |
| 2024/0039954 A1 | 2/2024 | Shete et al. |
| 2025/0047695 A1* | 2/2025 | Xu .................... H04L 63/1425 |

* cited by examiner

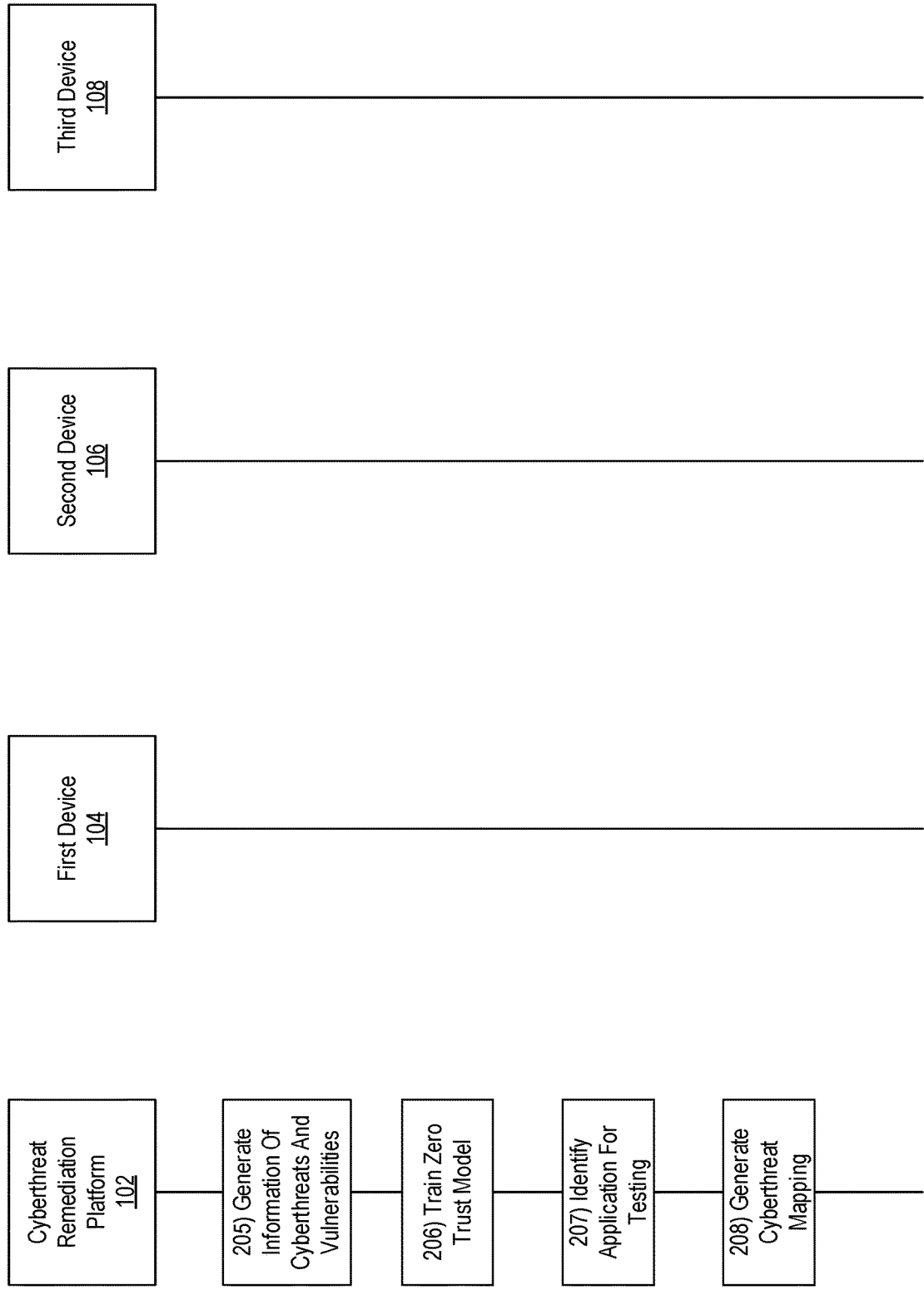

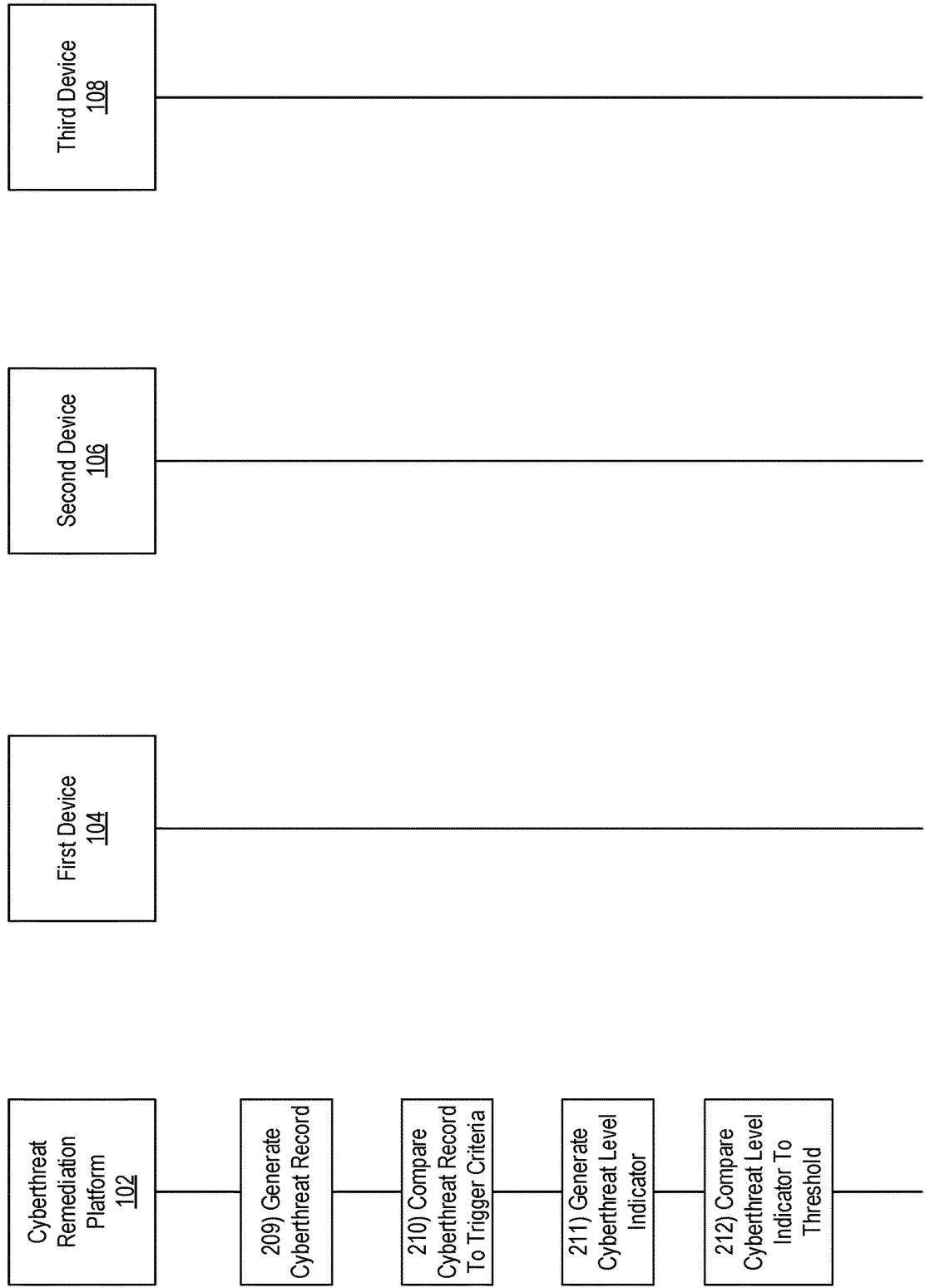

Zero Trust Table

| Vulnerability (i) / Threat (j) | | Closed | | Open |
|---|---|---|---|---|
| | | Remediated | N/A | |
| Open | | A(i,j) | B(i,j) | C(i,j) |
| Closed | No Longer Exist | D(i,j) | E(i,j) | H(i,j) |
| | False Positive (FP) | F(i,j) | G(i,j) | I(i,j) |

FIG. 3

CYBERTHREAT REMEDIATION USING A ZERO TRUST ENGINE

BACKGROUND

Aspects described herein are related to cyberthreat remediation using a zero trust engine. In some instances, entities such as an enterprise organization (e.g., a financial institution, and/or other institutions) may maintain a network of associated devices (e.g., user devices, such as laptops, cell phones, and the like, corresponding to employees and/or customers of the enterprise organization, and/or servers, server blades, or the like) that implement and/or manage one or more applications (e.g., user interface applications, information processing applications, mobile device applications, and/or other applications). In some instances, one or more cyberthreats (e.g., denial of service (DOS) attacks, SQL injection, privilege escalation, security risks, and/or other cyberthreats) may pose a threat to the network and/or applications. To prevent cyberthreats from affecting the network and/or applications, the enterprise organization might perform cyberthreat modeling and vulnerability scanning to identify cyberthreats that require remediation. Conventional methods of cyberthreat remediation may be inefficient and/or may require significant resources. For example, conventional methods of cyberthreat remediation may include remediation actions (such as penetration testing and/or manual review of each application on a network) to identify whether a cyberthreat risk for an application is below a threshold cyberthreat risk level, based on identifying vulnerabilities of the application. These remediation actions may require significant time and/or resources to perform, and thus may be inefficient to perform on a frequent basis. However, performing the remediation actions infrequently may make the network and/or applications more susceptible to cyberthreats in the intervening time between remediation actions. Accordingly, it may be important to efficiently and accurately identify applications of a network that require remediation while preserving resources.

SUMMARY

Aspects of the disclosure provide effective, efficient, scalable, and convenient technical solutions that address and overcome the technical problems associated with current methods of cyberthreat remediation. In accordance with one or more arrangements of the disclosure, a computing platform with at least one processor, a communication interface, and memory storing computer-readable instructions may receive, based on cyberthreat modeling and vulnerability scanning of one or more applications corresponding to a network, information of cyberthreats and vulnerabilities corresponding to the one or more applications. The computing platform may identify, based on one or more parameters, a first application, of the one or more applications, for cyberthreat testing. The computing platform may generate, based on a subset of information, of the information of cyberthreats and vulnerabilities and corresponding to the first application, a cyberthreat mapping for the first application. The cyberthreat mapping may comprise a plurality of vulnerability-cyberthreat pairings. The computing platform may generate, based on the cyberthreat mapping, a cyberthreat record. The cyberthreat record may comprise a representation of the cyberthreat mapping. The computing platform may generate, by comparing the cyberthreat record to one or more trigger criteria, a cyberthreat level indicator for the first application. The cyberthreat level indicator may indicate a likelihood of a cyberthreat affecting the first application. The computing platform may identify, by comparing the cyberthreat level indicator to a threshold, whether the cyberthreat level indicator satisfies the threshold. The computing platform may initiate, based on identifying that the cyberthreat level indicator satisfies the threshold, one or more cyberthreat remediation actions for the application.

In one or more examples, the computing platform may train, based on the information of cyberthreats and vulnerabilities, a zero trust model. Training the zero trust model may configure the zero trust model to generate cyberthreat mappings for applications based on input of information of cyberthreats and vulnerabilities. The computing platform may generate the cyberthreat mapping based on inputting the subset of information into the zero trust model. The computing platform may update, based on identifying whether the cyberthreat level indicator satisfies the threshold, the information of cyberthreats and vulnerabilities. The computing platform may update, based on the updated information of cyberthreats and vulnerabilities, the zero trust model. In one or more arrangements, the computing platform may update the zero trust model may be further based on initiating one or more cyberthreat remediation actions.

In one or more examples, the computing platform may perform cyberthreat modeling by identifying, based on the design of an application, one or more potential cyberthreats to the network and the vulnerability scanning comprises identifying whether the one or more potential cyberthreats are resolved. In one or more arrangements, the computing platform may identify the first application by identifying whether a threshold amount of time corresponding to cyberthreat testing of the first application is satisfied, and/or identifying whether an update time corresponding to the first application antedates a cyberthreat testing time corresponding to the first application.

In one or more examples, the trigger criteria may comprise one or more of: a ratio of incorrectly closed cyberthreats to correctly closed cyberthreats, a negative divergence between vulnerability scans of the first application, and/or a divergence between a ratio of unverified cyberthreats and a ratio of verified cyberthreats. In one or more arrangements, the computing platform may cause, based on identifying that the cyberthreat level indicator satisfies the threshold and prior to the initiating the one or more cyberthreat remediation actions, display of a cyberthreat remediation interface. In one or more examples, the one or more cyberthreat remediation actions may comprise one or more of: identifying, for each of the plurality of vulnerability-cyberthreat pairings, whether an associated cyberthreat is resolved, and/or resolving, based on the plurality of vulnerability-cyberthreat pairings, one or more cyberthreats.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for cyberthreat remediation using a zero trust engine in accordance with one or more example arrangements;

FIG. 3 depicts an illustrative cyberthreat record generated as part of cyberthreat remediation using a zero trust engine in accordance with one or more example arrangements;

DETAILED DESCRIPTION

Figure 1A:
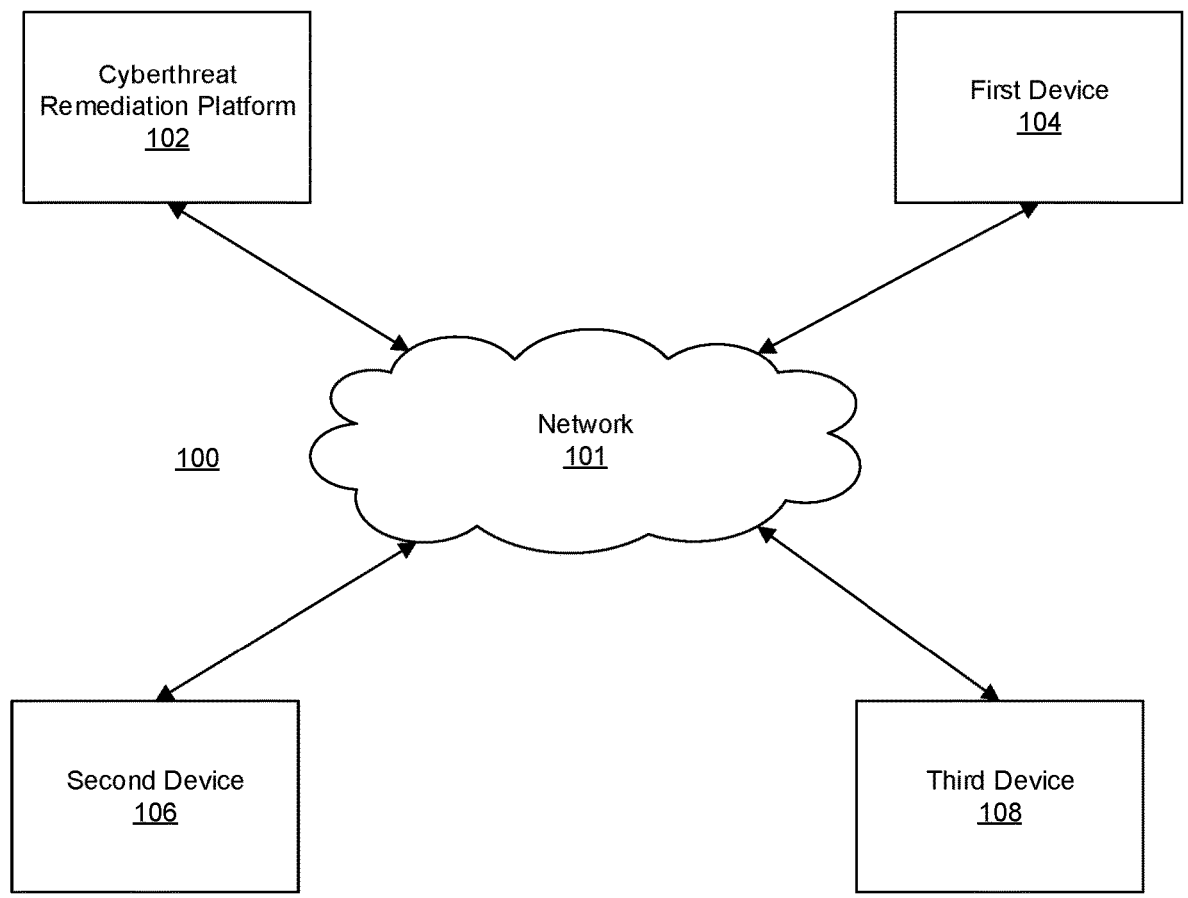
FIGS. 1A-1B depict an illustrative computing environment for cyberthreat remediation using a zero trust engine in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to cyberthreat remediation using a zero trust engine. In some instances, entities such as an enterprise organization (e.g., a financial institution, and/or other institutions) may maintain a network of associated devices (e.g., devices, such as laptops, cell phones, and the like, corresponding to employees and/or customers of the enterprise organization, and/or servers, server blades, or the like, associated with the enterprise organization) that implement and/or manage one or more applications (e.g., user interface applications, information processing applications, mobile device applications, and/or other applications). In some instances, one or more cyberthreats (e.g., denial of service (DOS) attacks, SQL injection, privilege escalation, security risks, and/or other cyberthreats) may pose a threat to the network and/or applications. To prevent cyberthreats from affecting the network and/or applications, the enterprise organization might perform cyberthreat modeling to predict potential cyberthreats to the network and/or applications. Additionally, the enterprise organization might use one or more scanning tools (e.g., network security applications, cyberthreat detection applications, and/or other scanning tools) to identify vulnerabilities (e.g., potential cyberthreats that have not been remediated, potential cyberthreats that have been incorrectly identified as remediated, and/or other vulnerabilities) indicating cyberthreats that require remediation.

The enterprise organization may track the vulnerabilities and/or cyberthreats via one or more internal applications. Cyberthreats, representing potential threats to the network and/or applications and that are identified via cyberthreat modeling, may be automatically and/or manually tagged as "remediated" in the one or more internal applications and identified for closure by an automated program and/or by a user (e.g., an employee of the enterprise organization, and/or other users). In some instances, manual action by the user may be required to perform cyberthreat modeling. In some examples threats may be improperly tagged as remediated before they have been successfully remediated. Vulnerability scanning may be performed periodically (e.g., every hour, every day, every week, and/or at other periodic times) to identify security vulnerabilities of devices connected to the network and/or application that may be susceptible to a cyberthreat. For example, cyberthreat modeling may be and/or comprise analyzing the design of an application to identify that an application should implement two-factor authentication, while vulnerability scanning may identify that an application which was tagged to receive two-factor authentication does not have two-factor authentication. The enterprise organization may implement remediation actions (e.g., penetration testing, manual review, and/or other remediation actions) to identify whether cyberthreats were properly tagged as remediated. These remediation actions may require significant time and/or resources to perform, and thus may be inefficient to perform on a frequent basis. However, performing the remediation actions infrequently may make the network and/or applications more susceptible to cyberthreats in the intervening time between remediation actions. Thus, there exists a need to efficiently and accurately identify applications corresponding to a network that require remediation while preserving resources.

Accordingly, in some instances, entities such as an enterprise organization and/or other organizations/institutions may employ a cyberthreat remediation platform, as described herein. A cyberthreat remediation platform may receive cyberthreat modeling information and vulnerability scanning information and store information of cyberthreats and vulnerabilities for each application of (e.g., associated with) a network. The cyberthreat remediation platform may be and/or comprise a zero trust engine. The zero trust engine may not "trust" tagging of cyberthreats performed during cyberthreat modeling (i.e., the zero trust engine may disregard and/or reevaluate the tags) and may use the results of vulnerability scans to identify whether any cyberthreats tagged as closed/remediated correspond to detected vulnerabilities indicating, for example, that the cyberthreat is not remediated. The cyberthreat remediation platform may generate, using the zero trust engine, cyberthreat mappings that map pairs of cyberthreats and vulnerabilities together. The cyberthreat remediation platform and/or the zero trust engine may use cyberthreat mappings when generating cyberthreat records (e.g., zero trust tables, and/or other data structures representing a record of cyberthreats and vulnerabilities). The cyberthreat remediation platform may compare the cyberthreat record with various trigger criteria (e.g., thresholds, results of executing algorithms, and/or other criteria). The cyberthreat remediation platform may generate indicators of a cyberthreat level based on the comparison of the cyberthreat record with the trigger criteria. Based on the indicators of the cyberthreat level (e.g., based on comparing a cyberthreat indicator to a threshold) the cyberthreat remediation platform may initiate cyberthreat remediation actions (e.g., penetration testing, and/or other cyberthreat remediation actions). In doing so, the cyberthreat remediation platform may cause cyberthreat remediation actions only to be taken when the cyberthreat level for an application reaches a critical/desired level, thus ensuring remediation actions are not taken too late or too early and thereby conserving resources.

In some examples, in performing the methods of deploying and/or utilizing the cyberthreat remediation platform as described herein, the cyberthreat remediation platform may train one or more machine learning models. For example, the cyberthreat remediation platform may be and/or comprise a zero trust engine that may, in some examples, train a zero trust model based on the information of cyberthreats and vulnerabilities to generate cyberthreat mappings for applications based on input of information of cyberthreats and vulnerabilities. The cyberthreat remediation platform may use the zero trust model to generate cyberthreat mappings comprising cyberthreat-vulnerability pairings. The cyberthreat mappings may be used by the cyberthreat remediation platform to subsequently generate cyberthreat records.

These and various other aspects will be discussed more fully herein.

Figure 1B:
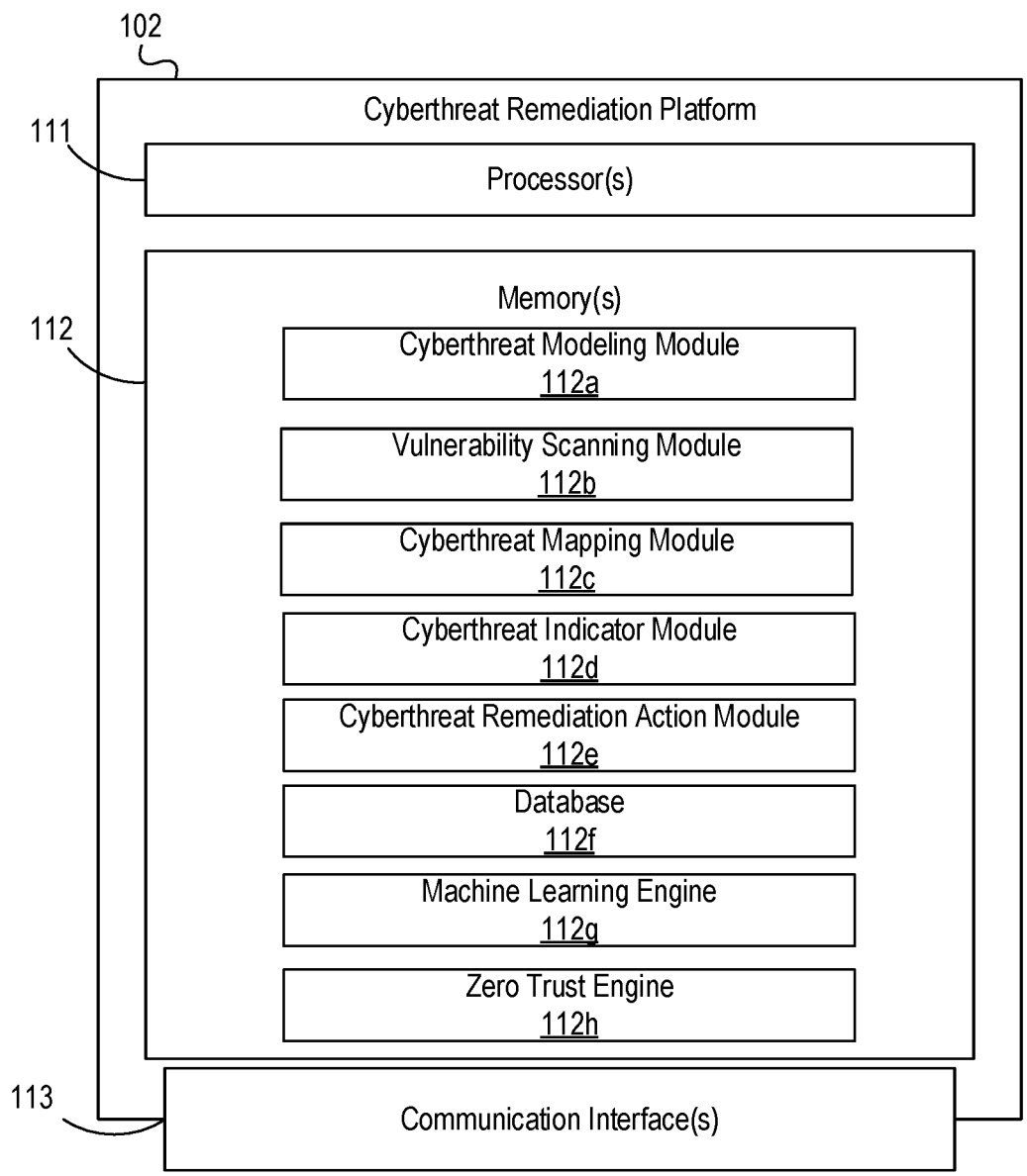

FIGS. 1A-1B depict an illustrative computing environment for cyberthreat remediation using a zero trust engine in accordance with one or more example arrangements. Referring to FIG. 1A, computing environment 100 may include one or more computer systems. For example, computing environment 100 may include a cyberthreat remediation platform 102, a first device 104, a second device 106, and a third device 108.

As described further below, cyberthreat remediation platform 102 may be or include a computer system that includes one or more computing devices (e.g., servers, laptop computers, desktop computers, mobile devices, tablets, smartphones, and/or other devices) and/or other computer components (e.g., processors, memories, communication interfaces) that may be used to receive cyberthreat and vulnerability information, implement a zero trust engine, and initiate remediation functions for cyberthreats. The cyberthreat remediation platform 102 may configure, train, and/or execute one or more machine learning models (e.g., a zero trust model, and/or other models). For example, the cyberthreat remediation platform 102 may train a zero trust model to generate cyberthreat mappings (e.g., pairings of identified cyberthreats and vulnerabilities) based on input of information of cyberthreats and vulnerabilities. The cyberthreat remediation platform 102 may be managed by and/or otherwise associated with an enterprise organization (e.g., a financial institution, and/or other institutions) that may, e.g., be associated with one or more additional systems (e.g., first device 104, second device 106, third device 108, and/or other systems). In one or more instances, the cyberthreat remediation platform 102 may be configured to communicate with one or more systems (e.g., first device 104, second device 106, third device 108, and/or other systems) to perform an information transfer, perform and/or receive information of cyberthreat modeling and/or vulnerability scanning, initiate remediation actions, and/or perform other functions.

The first device 104 may be a computing device (e.g., server, server blade, or the like) and/or other data storing or computing component (e.g., processors, memories, communication interfaces, databases) that may be used to transfer information between devices and/or perform other functions (e.g., execute information transfers, implement and/or interact with applications corresponding to a network managed by an enterprise organization, and/or other functions). The first device 104 may correspond to an entity (e.g., an enterprise organization, such as a financial institution and/or other institution). For example, the first device 104 may correspond to the same entity associated with the cyberthreat remediation platform 102. In one or more instances, the first device 104 may be configured to communicate with one or more systems (e.g., cyberthreat remediation platform 102, second device 106, third device 108, and/or other systems) as part of transmitting a message, implementing and/or interacting with applications corresponding to a network, performing cyberthreat modeling, and/or to perform other functions.

The second device 106 may be a computing device (e.g., server, server blade, or the like) and/or other data storing or computing component (e.g., processors, memories, communication interfaces, databases) similar to first device 104 that may be used to transfer information between devices and/or perform other functions (e.g., execute information transfers, implement and/or interact with applications corresponding to a network managed by an enterprise organization, and/or other functions). The second device 106 may correspond to an entity (e.g., an enterprise organization, such as a financial institution and/or other institution). For example, the second device 106 may correspond to the same entity associated with the cyberthreat remediation platform 102. In one or more instances, the second device 106 may be configured to communicate with one or more systems (e.g., cyberthreat remediation platform 102, first device 104, third device 108, and/or other systems) as part of transmitting a message, implementing and/or interacting with applications corresponding to a network, performing vulnerability scanning, and/or to perform other functions The third device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other functions (e.g., receiving transmissions, initiating remediation actions, and/or other functions). In one or more instances, third device 108 may correspond to an entity (e.g., an enterprise organization, such as a financial institution and/or other institution). For example, the third device 108 may correspond to the same entity associated with the cyberthreat remediation platform 102. In one or more instances, the third device 108 may be configured to communicate with one or more systems (e.g., cyberthreat remediation platform 102, and/or other systems) to receive transmissions, display a user interface, initiate remediation actions, and/or to perform other functions.

Although four devices are depicted herein, any number of such devices may be used to implement the methods and arrangements described herein without departing from the scope of the disclosure.

Computing environment 100 also may include one or more networks, which may interconnect cyberthreat remediation platform 102, first device 104, second device 106, and third device 108. For example, computing environment 100 may include a network 101 (which may interconnect, e.g., cyberthreat remediation platform 102, first device 104, second device 106, and third device 108).

In one or more arrangements, cyberthreat remediation platform 102, first device 104, second device 106, and third device 108 may be any type of computing device capable of sending and/or receiving requests and processing the requests accordingly. For example, cyberthreat remediation platform 102, first device 104, second device 106, and third device 108 and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of cyberthreat remediation platform 102, first device 104, second device 106, and third device 108 may, in some instances, be special-purpose computing devices configured to perform specific functions.

Referring to FIG. 1B, cyberthreat remediation platform 102 may include one or more processors 111, memory 112, and communication interface 113. A data bus may interconnect processor 111, memory 112, and communication interface 113. Communication interface 113 may be a network interface configured to support communication between cyberthreat remediation platform 102 and one or more networks (e.g., network 101, or the like). Communication interface 113 may be communicatively coupled to the processor 111. Memory 112 may include one or more program modules having instructions that, when executed by processor 111, cause cyberthreat remediation platform 102 to perform one or more functions described herein and/or one or more databases (e.g., a database 112f, or the like) that may store and/or otherwise maintain information which may be used by such program modules and/or processor 111. In some instances, the one or more program modules and/or databases may be stored by and/or maintained in different memory units of cyberthreat remediation platform 102 and/or by different computing devices that may form and/or otherwise make up cyberthreat remediation platform 102. For example, memory 112 may have, host, store, and/or include a cyberthreat modeling module 112a, a vulnerability scanning module 112b, a cyberthreat mapping module 112c, a cyberthreat indicator module 112d, a cyberthreat remediation action module 112e, a database 112f, a machine learning engine 112g, a zero trust engine 112h, and/or other modules and/or databases.

In some examples, one or more of the program modules and/or databases may be integrated together, overlap in one or more functions, and/or otherwise be associated with each other. For example, in some instances, the zero trust engine 112h may be and/or comprise one or more of cyberthreat modeling module 112a, vulnerability scanning module 112b, cyberthreat mapping module 112c, cyberthreat indicator module 112d, cyberthreat remediation action module 112e, database 112f, and/or machine learning engine 112g. Additionally or alternatively, in some examples, the one or more program modules and/or databases may each comprise one or more additional modules and/or additional databases. For example, in some instances, database 112f may comprise one or more additional databases (e.g., a cyberthreat remediation database, a zero trust table database, a cyberthreat mapping database, and/or other additional databases). It should be understood that the specific program modules described herein are merely examples and that one or more additional or alternative program modules may be hosted, stored, and/or otherwise included in memory 112 without departing from the scope of this disclosure.

Cyberthreat modeling module 112a may have instructions that direct and/or cause cyberthreat remediation platform 102 to communicate with the network 101, access applications via the network 101, receive information of potential cyberthreats, and/or perform other functions. Vulnerability scanning module 112b may have instructions that direct and/or cause cyberthreat remediation platform 102 to communicate with the network 101, access applications via the network 101, receive vulnerability scanning information, and/or perform other functions. Cyberthreat mapping module 112c may have instructions that direct and/or cause cyberthreat remediation platform 102 to identify cyberthreat and vulnerability pairings, process information of cyberthreats and vulnerabilities, and/or perform other functions. Cyberthreat indicator module 112d may have instructions that direct and/or cause cyberthreat remediation platform 102 to generate cyberthreat records based on cyberthreat mappings, compare cyberthreat records to trigger criteria, generate cyberthreat level indicators, and/or perform other functions. Cyberthreat remediation action module 112e may have instructions that direct and/or cause cyberthreat remediation platform 102 to cause initiation of remediation actions, cause display of user interfaces, and/or perform other functions. Database 112f may have instructions causing cyberthreat remediation platform 102 to store information of cyberthreats and vulnerabilities, cyberthreat mappings, cyberthreat records, and/or other information. Machine learning engine 112g may have instructions to train, implement, and/or update one or more machine learning models, such as zero trust model, and/or other machine learning models. Zero trust engine 112h may have instructions causing cyberthreat remediation platform 102 to access, execute, and/or otherwise utilize one or more program modules and/or databases (e.g., cyberthreat modeling module 112a, vulnerability scanning module 112b, cyberthreat mapping module 112c, cyberthreat indicator module 112d, cyberthreat remediation action module 112e, database 112f, machine learning engine 112g, and/or other program modules and/or databases) to perform one or more functions described herein. For example, zero trust engine 112h may have instructions that cause cyberthreat remediation platform 102 to receive information of cyberthreats and vulnerabilities (e.g., from threat modeling tools and/or application scanning tools, via devices such as first device 104, second device 106, or the like, and/or from other sources), train one or more machine learning models, generate cyberthreat mappings, generate cyberthreat records, and/or perform other functions described herein.

Although cyberthreat modeling module 112a, vulnerability scanning module 112b, cyberthreat mapping module 112c, cyberthreat indicator module 112d, cyberthreat remediation action module 112e, database 112f, machine learning engine 112g, and zero trust engine 112h are depicted as separate modules herein, the instructions stored by these modules may be stored in any number of modules without departing from the scope of this disclosure.

Figure 2A:
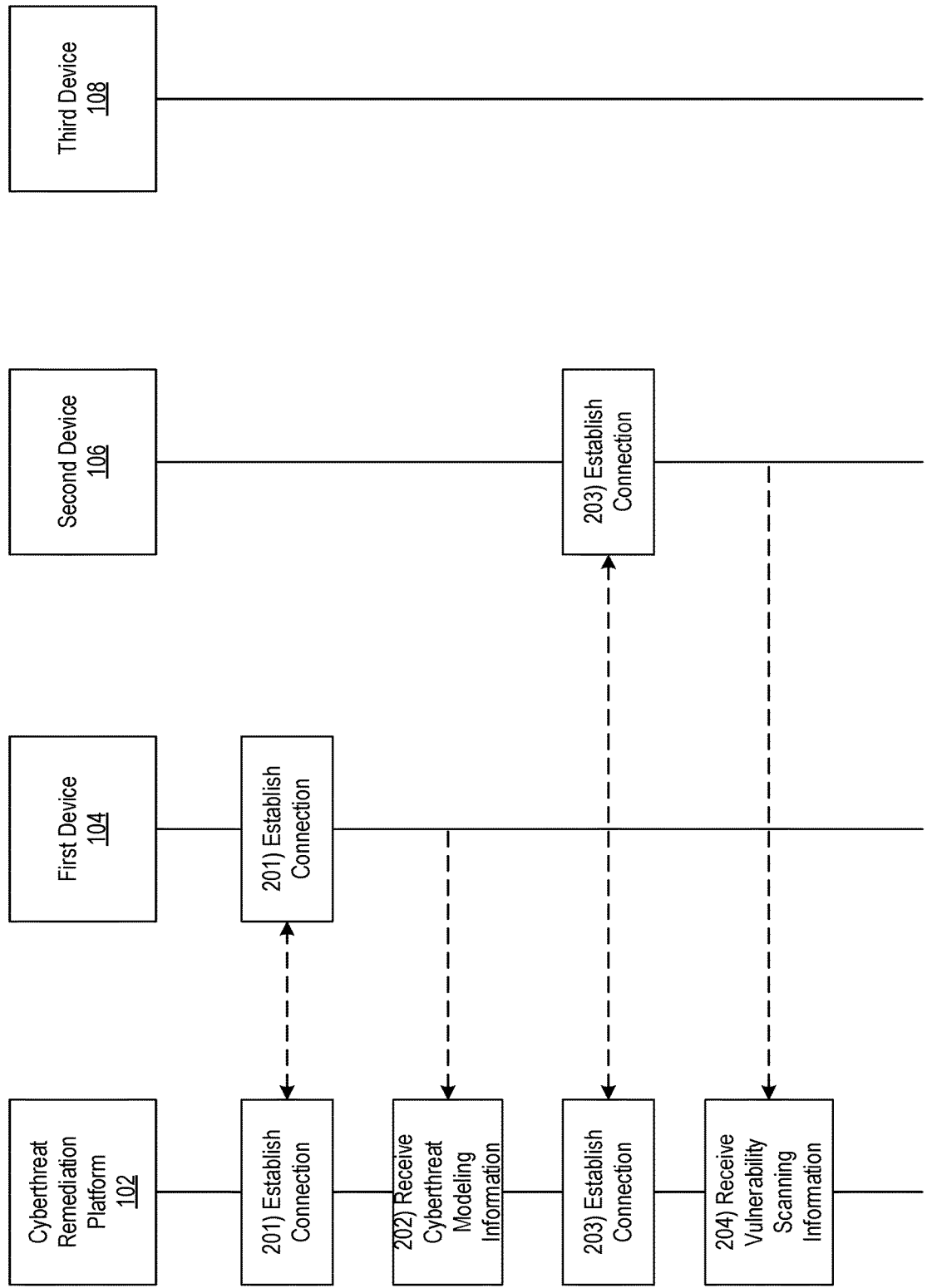

FIGS. 2A-2E depict an illustrative event sequence for cyberthreat remediation using a zero trust engine in accordance with one or more example arrangements. Referring to FIG. 2A, at step 201, the cyberthreat remediation platform 102 may establish a connection with the first device 104. For example, the cyberthreat remediation platform 102 may establish a first wireless data connection with the first device 104 to link the first device 104 with the cyberthreat remediation platform 102 (e.g., in preparation for receiving cyberthreat modeling information, and/or other functions). In some instances, the cyberthreat remediation platform 102 may identify whether or not a connection is already established with the first device 104. If a connection is already established with the first device 104, the cyberthreat remediation platform 102 might not re-establish the connection. If a connection is not yet established with the first device 104, the cyberthreat remediation platform 102 may establish the first wireless data connection as described above. In some examples, the cyberthreat remediation platform 102 may establish the connection automatically, as part of a cyberthreat modeling process. Although only one connection to a device (for example, the first device 104) is described in relation to step 201, the cyberthreat remediation platform 102 may establish connections as described above to one or more additional devices associated with network 101 as part of methods of performing cyberthreat remediation using a zero trust engine as described herein.

At step 202, the cyberthreat remediation platform 102 may receive cyberthreat modeling information. For example, the cyberthreat remediation platform 102 may receive the cyberthreat modeling information from first device 104 (and/or one or more additional devices). Additionally or alternatively, in some examples the cyberthreat modeling information may be generated by the cyberthreat remediation platform 102 (e.g., via one or more threat modeling tools implemented by one or more computing devices and/or components of the cyberthreat remediation platform 102 separate from the zero trust engine). In some instances, the cyberthreat modeling information may comprise information identifying, based on the design of an application, one or more potential cyberthreats to the network and/or one or more specific applications corresponding to the network. In some examples, the cyberthreat modeling information may be and/or comprise information gathered using one or more threat modeling tools. Cyberthreat modeling may be performed (e.g., by the first device 104, and/or other devices) periodically (e.g., every three months, every six months, annually, and/or any other period of time).

One or more cyberthreats (e.g., denial of service (DOS) attacks, SQL injection, privilege escalation, security risks, and/or other cyberthreats) may be identified for each of one or more applications (e.g., user interface applications, information processing applications, mobile device applications, and/or other applications) maintained by and/or otherwise associated with the first device 104. Each cyberthreat may be classified during cyberthreat modeling (e.g., assigned a category, such as severe, critical, high, medium, low, and/or other categories, given a numeric value, and/or otherwise classified). For example, cyberthreat modeling for an application may identify, based on analyzing the design of the application, that the application is susceptible to password-stealing attacks and may classify the risk of a password-stealing attack affecting the application as "critical". Additionally or alternatively, in some instances, cyberthreat modeling may comprise tagging cyberthreats as "remediated" (e.g., corrected, resolved, fixed, and/or otherwise remediated). For example, based on cyberthreat modeling identifying that an application is susceptible to password-stealing attempts, a program (e.g., a network security application, or the like) and/or a user (e.g., an employee of the enterprise organization, and/or other users) may identify that the cyberthreat may be remediated by, for example, implementing two-factor authentication and may tag (e.g., by storing a digital indicator in correlation with information of the cyberthreat, and/or by other methods of indicating a status of the cyberthreat) the cyberthreat as "remediated." In some instances, the cyberthreat may be remediated. In some examples, the cyberthreat might not be remediated and may be incorrectly tagged as remediated (e.g., due to user error, a software error, and/or other causes). In modeling the one or more cyberthreats, the cyberthreat remediation platform 102 may generate and/or store information of cyberthreats (e.g., based on receiving information from the first device 104) that may, for example, comprise the identified cyberthreats, identified remediation options, tags indicating whether a cyberthreat has been remediated, and/or other information gathered during cyberthreat modeling.

At step 203, the cyberthreat remediation platform 102 may establish a second wireless data connection with the second device 106 to link the second device 106 with the cyberthreat remediation platform 102 (e.g., in preparation for receiving vulnerability scanning information, and/or other functions). In some instances, the cyberthreat remediation platform 102 may identify whether or not a connection is already established with the second device 106. If a connection is already established with the second device 106, the cyberthreat remediation platform 102 might not re-establish the connection. If a connection is not yet established with the second device 106, the cyberthreat remediation platform 102 may establish the second wireless data connection as described above. In some examples, the cyberthreat remediation platform 102 may establish the connection automatically, as part of a vulnerability scanning process. Although only one connection to a device (for example, the second device 106) is described in relation to step 203, the cyberthreat remediation platform 102 may establish connections as described above to one or more additional devices associated with network 101 as part of methods of performing cyberthreat remediation using a zero trust engine as described herein.

At step 204, the cyberthreat remediation platform 102 may receive vulnerability scanning information. For example, the cyberthreat remediation platform 102 may receive the vulnerability scanning information from second device 106 (and/or one or more additional devices). Additionally or alternatively, in some examples, the vulnerability scanning information may be generated by the cyberthreat remediation platform 102 (e.g., via one or more vulnerability scanning tools applied to one or more applications at a remote device, such as second device 106, by one or more computing devices and/or components of the cyberthreat remediation platform 102 separate from the zero trust engine). The vulnerability scanning information may be based on scanning (e.g., by the cyberthreat remediation platform 102, the first device 104, and/or other devices) one or more applications maintained by devices connected to the network 101 for vulnerabilities. Scanning devices for vulnerabilities may comprise scanning one or more applications implemented by and/or stored on the device (e.g., the second device 106, and/or other devices) for vulnerabilities (e.g., security risks, outdated software, improperly tagged cyberthreat remediations, and/or other vulnerabilities). Vulnerability scanning may comprise utilizing one or more scanning tools (e.g., static application scan tools, dynamic application scan tools, and/or other tools) configured to identify vulnerabilities in applications, devices, and/or networks. In some examples, vulnerability scanning may comprise identifying whether one or more cyberthreats (e.g., cyberthreats modeled and/or identified in information received at step 202) are tagged as closed (e.g., remediated, not applicable to the application/device/network, and/or otherwise closed) or open (e.g., indicating that the cyberthreat has not been remediated). In these examples, vulnerability scanning may further comprise identifying, for each cyberthreat, whether a vulnerability associated with the cyberthreat is open (e.g., indicating that the cyberthreat has not been remediated/resolved) or closed (e.g., indicating that there is no longer a vulnerability associated with the cyberthreat, based on identifying that the cyberthreat no longer exists, the cyberthreat was a false positive, and/or other indications that the cyberthreat has been remediated/resolved). For example, if cyberthreat modeling information identified that an application was susceptible to password-stealing attacks and that implementing two-factor authentication would remediate the cyberthreat, vulnerability scanning may identify whether two-factor authentication has been implemented. Based on identifying that two-factor authentication has not been implemented, the vulnerability scanning may identify that the lack of two-factor authentication is a vulnerability that is open. Based on identifying that two-factor authentication has been implemented, vulnerability scanning may identify that the vulnerability no longer exists (e.g., is closed). In performing vulnerability scanning, the cyberthreat remediation platform 102 may generate information of vulnerabilities that may, for example, comprise information of identified vulnerabilities, indications of whether the vulnerability is open or closed, and/or other information gathered during vulnerability scanning.

Referring to FIG. 2B, at step 205, the cyberthreat remediation platform 102 may generate information of cyberthreats and vulnerabilities corresponding to one or more applications corresponding to the network 101. In some examples, generating the information of cyberthreats and vulnerabilities may comprise collating, collecting, and/or otherwise combining information of cyberthreats and vulnerabilities received at steps 202 and 204. For example, the cyberthreat remediation platform 102 may generate the information of cyberthreats of step 202 (e.g., identified cyberthreats, identified remediation options, tags indicating whether a cyberthreat has been remediated, and/or other information gathered during and/or from cyberthreat modeling) and/or the information of vulnerabilities of step 204 (e.g., information of identified vulnerabilities, indications of whether the vulnerability is open or closed, and/or other information gathered during vulnerability scanning). In generating the information of cyberthreats and vulnerabilities, the cyberthreat remediation platform 102 may store the information of cyberthreats and vulnerabilities (e.g., information gathered at steps 202 and 203) remotely and/or locally (e.g., at database 112*f*, and/or other local storage).

At step 206, based on generating the information of cyberthreats and vulnerabilities, the cyberthreat remediation platform 102 may train the zero trust engine which may, for example, be and/or comprise a computer program and/or one or more machine learning models. For example, in some instances, in training the zero trust engine, the cyberthreat remediation platform 102 may use, configure, and/or otherwise cause the zero trust engine to train one or more machine learning models. For example, the zero trust engine may train a zero trust model based on the information of cyberthreats and vulnerabilities. The zero trust engine may train the zero trust model to generate cyberthreat mappings for applications based on input of information of cyberthreats and vulnerabilities. For example, the cyberthreat remediation platform 102 may, via the zero trust engine, configure the zero trust model to utilize information of cyberthreats and vulnerabilities to identify pairings between cyberthreats and vulnerabilities, as part of generating cyberthreat mappings. In some instances, to configure and/or otherwise train the zero trust model, the cyberthreat remediation platform 102 may use the zero trust engine to process the information of cyberthreats and vulnerabilities by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques.

In some examples, in configuring and/or otherwise training the zero trust engine, the cyberthreat remediation platform 102 may cause the zero trust engine to identify vulnerability-cyberthreat pairings as part of generating cyberthreat mappings. In some examples, the cyberthreat remediation platform 102 may cause the zero trust engine to identify vulnerability-cyberthreat pairings based on common vulnerabilities and exposures (CVEs). For instance, the cyberthreat remediation platform 102 may use a CVE glossary, list, or the like to identify common vulnerabilities and map vulnerabilities identified by vulnerability scanning to cyberthreats identified by cyberthreat modeling. Additionally or alternatively, the cyberthreat remediation platform 102 may cause the zero trust engine to identify vulnerability-cyberthreat pairings based on shared characteristics of cyberthreats and vulnerabilities. For instance, the cyberthreat remediation platform 102 may cause the zero trust engine to store one or more correlations between characteristics of cyberthreats and characteristics of vulnerabilities. Characteristics of cyberthreats and vulnerabilities may comprise one or more of a type of cyberthreat, a type of device (e.g., mobile device, laptop, tablet, server, and/or other types of devices) associated with a cyberthreat, a category of remediation action (e.g., no user input required, user input required, one-time action, periodic action, continuous action, and/or other categories related to remediation actions for the cyberthreat), a type of application (e.g., user interface applications, information processing applications, mobile device applications, and/or other applications) associated with a cyberthreat, and/or other characteristics associated with cyberthreats and vulnerabilities. In some instances, if the zero trust engine trains a zero trust model, the cyberthreat remediation platform 102 may cause the zero trust engine to further store the one or more correlations in association with the zero trust model.

The cyberthreat remediation platform 102 may, for example, cause the zero trust engine to store a correlation between a cyberthreat related to application security and one or more vulnerabilities related to resolving threats to application security. For instance, the zero trust engine may store a correlation between a cyberthreat identifying that the security for an application is insufficient and one or more vulnerabilities related to resolving security issues such as, for example, an identification that the application lacks two-factor authentication, an identification that the application lacks password strength requirements, an identification that the application lacks one-time passwords, and/or other vulnerabilities. In these examples, in training the zero trust model, the cyberthreat remediation platform 102 may cause the zero trust engine to use the stored correlations to generate a vulnerability-cyberthreat paring between a cyberthreat identifying that application security strength is insufficient for the application and each of the one or more vulnerabilities related to resolving application security issues.

At step 207, the cyberthreat remediation platform 102 may identify one or more applications for cyberthreat testing. By identifying the one or more applications for cyberthreat testing, the cyberthreat remediation platform 102 may limit the resources necessary for cyberthreat testing by limiting the frequency of cyberthreat testing. For example, the cyberthreat remediation platform 102 may cause the zero trust engine to identify applications corresponding to the network 101 that require cyberthreat testing only if an application satisfies one or more parameters (e.g., an amount of time related to cyberthreat testing, an update time related to the application, and/or other parameters). In some examples, the cyberthreat remediation platform 102 may cause the zero trust engine to identify an application for cyberthreat testing based on identifying whether a threshold amount of time corresponding to cyberthreat testing of the application is satisfied. For example, the cyberthreat remediation platform 102 may cause the zero trust engine to identify an application for cyberthreat testing based on identifying that the application has not received cyberthreat testing for an amount of time greater than a threshold amount of time. In these examples, based on a threshold amount of time of, for example, one month, the zero trust engine may identify applications for cyberthreat testing if they have not received cyberthreat testing in over one month, while the zero trust engine might not identify applications for cyberthreat testing if they have received cyberthreat testing within one month. Additionally or alternatively, in some instances, the cyberthreat remediation platform 102 may cause the zero trust engine to identify an application for cyberthreat testing based on identifying whether an update time corresponding to an application antedates a cyberthreat testing time of the application. For example, based on identifying that an update time for an application (which may, e.g., indicate the time at which the application was last updated) was on Tuesday of a given week and based on identifying that a cyberthreat testing time of the application (which may, e.g., indicate the time at which the application last received cyberthreat testing) was on Monday of the given week, the zero trust engine may identify the application for cyberthreat testing.

At step 208, the cyberthreat remediation platform 102 may generate a cyberthreat mapping for the one or more applications identified for cyberthreat testing at step 207. For example, the cyberthreat remediation platform 102 may, for an application, cause the zero trust engine to generate the cyberthreat mapping for an application based on information of cyberthreats and vulnerabilities (e.g., the information generated at step 205, and/or other information of cyberthreats and vulnerabilities previously generated by the cyberthreat remediation platform 102). The cyberthreat remediation platform 102 may generate the cyberthreat mapping by inputting a subset of the information of cyberthreats and vulnerabilities corresponding to the application into the zero trust engine. Based on inputting the subset of information corresponding to the application into the zero trust engine, the cyberthreat remediation platform 102 may cause the zero trust engine to identify a plurality of vulnerability-cyberthreat pairings based on stored correlations between cyberthreats and vulnerabilities. For example, in generating the cyberthreat mapping, the cyberthreat remediation platform 102 may cause the zero trust engine to use CVEs to identify common vulnerabilities and map vulnerabilities identified by vulnerability scanning to cyberthreats identified by cyberthreat modeling. Additionally or alternatively, the cyberthreat remediation platform 102 may cause the zero trust engine to compare each cyberthreat included in the subset of information with one or more correlations, stored by the zero trust engine (e.g., as part of training the zero trust engine and/or the zero trust model of step 206) and identifying at least one vulnerability in the subset of information that is related to the cyberthreat based on shared characteristics of cyberthreats and vulnerabilities. For instance, based on identifying a cyberthreat included in the subset of information indicates that the application should be updated weekly to mitigate the risk of a cyberattack, the cyberthreat remediation platform 102 may cause the zero trust engine to identify, based on a stored correlation between cyberthreats associated with updating the application and vulnerabilities associated with updating the application, that a vulnerability was included in the subset of information indicating that the application is scheduled for annual updates. Accordingly, in these instances, the cyberthreat remediation platform 102 may cause the zero trust engine to add, to a cyberthreat mapping, a vulnerability-cyberthreat pairing between the cyberthreat associated with updating the application and the vulnerability associated with updating the application. It should be understood that the above is merely an example of how the cyberthreat remediation platform 102 may cause the zero trust engine to generate a cyberthreat mapping and that the cyberthreat remediation platform 102 may cause the zero trust engine to add one or more additional vulnerability-cyberthreat pairings to the cyberthreat mapping based on one or more additional stored correlations without departing from the scope of this disclosure.

In some examples, inputting the subset of information of cyberthreats and vulnerabilities into the zero trust engine may comprise inputting the subset of information into a machine learning model such as, for example, the zero trust model of step 206. In these examples, based on inputting the subset of information into the zero trust model the zero trust engine may identify a plurality of vulnerability-cyberthreat pairings based on stored correlations between cyberthreats and vulnerabilities. For example, in generating the cyberthreat mapping, the zero trust engine may cause the zero trust model to compare each cyberthreat included in the subset of information with one or more correlations, stored by the zero trust engine (e.g., as part of training the zero trust engine and/or the zero trust model of step 206) and identifying at least one vulnerability in the subset of information that is related to the cyberthreat based on shared characteristics of cyberthreats and vulnerabilities. In some examples, the zero trust model may use one or more machine learning algorithms to identify vulnerability-cyberthreat pairings. For example, the zero trust engine may have previously trained the zero trust model to employ a pairing algorithm to identify vulnerability-cyberthreat pairings based on a similarity of the number of characteristics shared between a cyberthreat and a vulnerability. For instance, the zero trust model may execute the pairing algorithm using the following constraints/parameters:

$$\text{If} \left( \frac{\text{(number of shared characteristics)}}{\text{(total number of compared characteristics)}} \right) \geq$$
$$0.5, \text{ then: similarity score} =$$
$$\left( 100 * \frac{\text{(number of shared characteristics)}}{\text{(total number of compared characteristics)}} \right). \text{ If else, then:}$$
$$\text{similarity score} = 0.$$

In this example, the zero trust model may execute the pairing algorithm to identify whether, based on comparing the characteristics of a cyberthreat included in the subset of information and the characteristics of a vulnerability included in the subset of information, the quotient of the number of shared characteristics divided by the total number of compared characteristics (e.g., based on stored correlations) meets or exceeds 50%. Based on identifying that the quotient meets or exceeds 50%, the zero trust model may generate a similarity score for the vulnerability-cyberthreat paring that is equal to the 100 multiplied by the quotient. Else, the zero trust model may generate a similarity score of 0, indicating that vulnerability and the cyberthreat are not a pairing.

In some examples, based on executing the algorithm and identifying a similarity of the number of characteristics shared between a cyberthreat and a vulnerability and as part of generating the cyberthreat mapping, the zero trust engine may compare a similarity score of the vulnerability-cyberthreat pairing to a threshold to identify whether to add the vulnerability-cyberthreat pairing to the cyberthreat mapping. For example, in the pairing algorithm example above, the zero trust model may compare the similarity score to a threshold score of 75%. If the quotient meets or exceeds 75%, the zero trust engine might add the vulnerability-cyberthreat pairing to the cyberthreat mapping. If the quotient meets or exceeds 50% but does not meet or exceed 75%, the zero trust engine might not add the vulnerability-cyberthreat paring to the cyberthreat mapping. It should be understood that the above example is merely one algorithm the zero trust model may be trained to employ in order to generate the cyberthreat mapping and in one or more instances additional or alternative algorithms may be employed and/or may correspond to different parameters.

Referring to FIG. 2C, at step 209, the cyberthreat remediation platform 102 may generate a cyberthreat record for an application. For example, the cyberthreat remediation platform 102 may cause the zero trust engine to generate a cyberthreat record for the application associated with the cyberthreat mapping of step 208. The cyberthreat record may comprise a representation of the cyberthreat mapping. For example, the cyberthreat mapping may be and/or comprise a vector, embedding, and/or other data structure comprising information of cyberthreats, vulnerabilities, and cyberthreat-vulnerability pairings and the cyberthreat record may be and/or comprise a table, chart, graph, and/or other method of providing a representation (e.g., an electronic representation, a visual representation, and/or other representations) of the information included in the cyberthreat mapping. In generating the cyberthreat record, the cyberthreat remediation platform 102 may cause the zero trust engine to parse, synthesize, and/or otherwise analyze the cyberthreat mapping to identify the status of the vulnerability-cyberthreat pairings mapped in the cyberthreat mapping. For example, the zero trust engine may generate a threat-centric cyberthreat record (such as a zero trust table, or the like) that represents the status of each cyberthreat and each vulnerability from the latest cyberthreat modeling (e.g., based on the cyberthreat modeling information of step 202) and the latest vulnerability scan (e.g., based on the vulnerability information of step 204). Accordingly, the cyberthreat record may be and/or comprise a representation of cyberthreats and vulnerabilities that are open (e.g., unresolved/unremediated) and closed (e.g., cyberthreats tagged as remediated, vulnerabilities that no longer exist, and/or vulnerabilities that were false positives) and that were identified subsequent to a previous remediation action, such as a penetration scan.

For example, the cyberthreat remediation platform 102 may cause the zero trust engine to generate a cyberthreat record such as zero trust table 300, as depicted in FIG. 3. Referring to FIG. 3, a cyberthreat record such as zero trust table 300 may represent information of the cyberthreats identified in the latest cyberthreat modeling ("j") and the vulnerabilities identified in the latest vulnerability scan ("i"). The information of the cyberthreats and vulnerabilities may include the status of the cyberthreats. For example, the zero trust table 300 may identify which cyberthreats have been closed and which are open. The zero trust table 300 may further identify which vulnerabilities are closed and which are open. The zero trust table 300 may include information indicating the reason cyberthreats and/or vulnerabilities were closed (e.g., based on the information of cyberthreats and vulnerabilities). For example, the zero trust table 300 may include a column for cyberthreats that were tagged as remediated and a column for cyberthreats that were tagged as "not applicable" (N/A) for the application being tested. Additionally or alternatively, the zero trust table 300 may include a row for vulnerabilities that, based on the latest vulnerability scan, no longer exist (e.g., based on an associated cyberthreat in a vulnerability-cyberthreat pairing having been accurately tagged as remediated). The zero trust table 300 may additionally or alternatively include a row for vulnerabilities that were identified as false positives (e.g., based on an associated cyberthreat in a vulnerability-cyberthreat pairing being identified, during a vulnerability scan, as not representing a risk to the application). The zero trust table 300 may include values (e.g., integers, percentages, fractions, decimals, and/or other values) representing the current count of cyberthreats, in the cyberthreat mapping, that correspond to each status. For example, as shown in FIG. 3, the zero trust table 300 may include values $A(i,j)$-$I(i,j)$. In the example depicted in FIG. 3, the values may represent cyberthreats as follows:

$A(i,j)$: Number of cyberthreats closed as remediated but with a mapped vulnerability that is still open according to the latest vulnerability scan $B(i,j)$: Number of cyberthreats closed as "Not Applicable N/A" but with a mapped vulnerability that is still open according to the latest vulnerability scan $C(i,j)$: Number of cyberthreats that are tagged as open and with a mapped vulnerability that is still open according to the latest vulnerability scan $D(i,j)$: Number of cyberthreats closed as remediated and with a mapped vulnerability that is closed as it no longer exists according to the latest vulnerability scan $E(i,j)$: Number of cyberthreats closed as "Not Applicable N/A" and with a mapped vulnerability that is closed as it no longer exists according to the latest vulnerability scan $F(i,j)$: Number of cyberthreats closed as remediated and with a mapped vulnerability that is closed as it was a false positive (FP) according to the latest vulnerability scan $G(i,j)$: Number of cyberthreats closed as "Not Applicable N/A" and with a mapped vulnerability that is closed as it was a false positive (FP) according to the latest vulnerability scan $H(i,j)$: Number of cyberthreats that are still open and with a mapped vulnerability that is closed as it no longer exists according to the latest vulnerability scan $I(i,j)$: Number of cyberthreats that are still open and with a mapped vulnerability that is closed as it was a false positive (FP) according to the latest vulnerability scan As the application is scanned (e.g., in one or more additional iterations of step 204) the total number of cyberthreats (e.g., the sum of values A-I in zero trust table 300) may remain constant while the individual values of A-I may vary based on vulnerability scanning identifying a change in status of cyberthreats that were previously open.

Referring back to FIG. 2C and step 209, it should be understood that, in some examples, steps 204-209 may be repeated one or more additional times prior to advancing to step 210. For example, based on one or more parameters and/or rules implemented by the enterprise organization associated with cyberthreat remediation platform 102, vulnerability scanning may be performed a predetermined number of times for each instance of cyberthreat modeling. For instance, cyberthreat modeling may be performed on, for example, a monthly or annual basis while vulnerability scanning may be performed, for example, daily. In these instances, steps 204-209 may be repeated daily for a period of time prior to proceeding to step 210. Accordingly, the cyberthreat record (e.g., the zero trust table 300 of FIG. 3) may be updated one or more times prior to proceeding to step 210.

At step 210, the cyberthreat remediation platform 102 may compare the cyberthreat record to one or more trigger criteria. In some examples, the cyberthreat remediation platform 102 may compare the cyberthreat record to one or more trigger criteria using a computer program, a process, and/or by other methods different from the zero trust engine. Accordingly, in some examples, the cyberthreat remediation platform 102 may use the zero trust engine to perform steps 201-209 but not step 210 and/or subsequent steps described herein. In this way, the functions of the zero trust engine may be generating cyberthreat records and associated functions required to generate cyberthreat records.

In comparing the cyberthreat record to the trigger criteria, the cyberthreat remediation platform 102 may compare the cyberthreat record to the trigger criteria using one or more algorithms defined to identify risks and divergence between threats and vulnerabilities of the application. For example, the cyberthreat remediation platform 102 may implement one or more algorithms to compare values indicating the status of cyberthreats (e.g., values A-I in zero trust table 300 of FIG. 3) to the trigger criteria to identify whether the trigger criteria are satisfied. In some instances, satisfying the trigger criteria may indicate that remediation actions (e.g., penetration testing, and/or other remediation actions) should be performed for the application associated with the cyberthreat record. Trigger criteria may comprise one or more thresholds, rules, test, and/or other metrics used to identify whether remediation actions should be performed. For example, in some instances, the trigger criteria may be and/or include a ratio of correctly closed cyberthreats to incorrectly closed cyberthreats. For instance, the trigger criteria may be a ratio $R(i,j)$, where "i" represents a vulnerability and "j" represents a cyberthreat. The trigger criteria may be satisfied where the ratio $R(i,j)$ of correctly closed cyberthreats to incorrectly closed cyberthreats is greater than a threshold value. In these instances, the cyberthreat remediation platform 102 may implement an algorithm when comparing the cyberthreat record to the trigger criteria. For example, referring to the example cyberthreat record depicted in zero trust table 300 in FIG. 3, the cyberthreat remediation platform 102 may implement an algorithm for comparing the zero trust table 300 to the trigger criteria where ratio $R(i,j)$ is defined as the quotient of the sum of values $E(i,j)$ and $F(i,j)$ divided by the sum of values $D(i,j)$ and $G(i,j)$, as described with respect to zero trust table 300:

$$R(i, j) = \left(\frac{(E(i, j) + F(i, j))}{(D(i, j) + G(i, j))}\right)$$

$E(i,j)$ and $F(i,j)$ may correspond to cyberthreats that were incorrectly closed because they represent, respectively, cyberthreats that were tagged as not applicable to the application but with corresponding vulnerabilities that were tagged as no longer exist during a vulnerability scanning (indicating, for example, that some remediation action was taken to correct the cyberthreat despite it being tagged as not applicable) and cyberthreats that were tagged as remediated but with corresponding vulnerabilities that were tagged as false positives during a vulnerability scanning. $D(i,j)$ and $G(i,j)$ may correspond to cyberthreats that were correctly closed because they represent, respectively, cyberthreats that were tagged as remediated and that are mapped to vulnerabilities that were revealed to no longer exist during vulnerability scanning and cyberthreats that were tagged as not applicable and that were revealed to be false positive cyberthreats during a vulnerability scanning. The threshold value may be a threat tolerance (TT) selected by a user and/or ruleset determined by the enterprise organization associated with the cyberthreat remediation platform 102. For example, the TT may be set to "1," which may, for example, indicate that if $R(i,j)$ exceeds 1 (indicating that more cyberthreats are incorrectly closed than are correctly closed) then remediation actions should be performed. The TT may be selected based on parameters such as a desired frequency of remediation actions for the application associated with the cyberthreat record, a measure of how critical the application associated with the cyberthreat record is to the enterprise organization associated with cyberthreat remediation platform 102, and/or other parameters. Based on comparing the cyberthreat record to the trigger criteria and identifying that the ratio $R(i,j)$ exceeds or meets/is below 1, the cyberthreat remediation platform 102 may store an indication that the trigger criteria was satisfied.

Additionally or alternatively, in some examples, the trigger criteria may be and/or include one or more other criteria. For example, the trigger criteria may be and/or include a negative divergence between vulnerability scans of the application. The negative divergence between vulnerability scans of the application may be and/or include a negative difference between the ratio of incorrectly closed cyberthreats to correctly closed cyberthreats identified in a first vulnerability scan ($R(i-1,j)$) and the ratio of incorrectly closed cyberthreats to correctly closed cyberthreats identified in a second, subsequent vulnerability scan ($R(i,j)$). For instance, the trigger criteria may be satisfied if $R(i-1,j)$ is less than $R(i,j)$, indicating that there is a negative divergence between correctly closed cyberthreats between vulnerability scans. In some examples, the trigger criteria may be satisfied only if a counter ("K") associated with negative divergences reaches a threshold value. For example, K may be a value (e.g., an integer, a decimal, a percentage, and/or any other value) that is incremented each time $R(i-j,j)$ is less than $R(i,j)$. In these examples, step 210 may be repeated an additional instance for each of a number of vulnerability scans prior to proceeding to step 211. Accordingly, for each vulnerability scan, each instance where $R(i-1,j)$ is less than $R(i,j)$ the counter K may be incremented and, if K reaches a threshold value, the cyberthreat remediation platform 102 may store an indication that the trigger criteria was satisfied.

In some examples, rather than a ratio of incorrectly closed cyberthreats to correctly closed cyberthreats, the trigger criteria discussed above may be related to a ratio of unverified cyberthreats and a ratio of verified cyberthreats. For example, if, after a number of vulnerability scans, the ratio of the number of unverified cyberthreats divided by the total number of cyberthreats is identified to increase at a faster rate than the ratio of verified cyberthreats divided by the total number of cyberthreats, the cyberthreat remediation platform 102 may store an indication that the trigger criteria was satisfied.

It should be understood that the examples of trigger criteria described herein are merely illustrative and that one or more additional or alternative criteria and/or algorithms identifying the risks and divergence between cyberthreats and vulnerabilities, using the parameters described above and/or other parameters, may be used without departing from the scope of this disclosure. Regardless of the trigger criteria used, the cyberthreat remediation platform 102 may, as part of comparing the cyberthreat record to the trigger criteria, store indications of whether the trigger criteria were satisfied.

At step 211, based on comparing the cyberthreat record to the trigger criteria, the cyberthreat remediation platform 102 may generate a cyberthreat level indicator for the application. In generating the cyberthreat level indicator, the cyberthreat remediation platform 102 may implement one or more algorithms configured to identify a level of cyberthreat risk based on the comparison of the cyberthreat record to the trigger criteria. The cyberthreat level indicator may be a percentage, an integer, a decimal, a fraction, and/or any other value. The cyberthreat remediation platform 102 may generate the cyberthreat level indicator based on, for example, a number of trigger criteria that were satisfied, based on comparing the cyberthreat record to the one or more trigger criteria. For example, in some instances, the cyberthreat level indicator may be a binary value of 0 or 1, where a cyberthreat level indicator of 1 is generated based on a trigger criteria being satisfied and a cyberthreat level indicator of 0 is generated based on a trigger criteria not being satisfied. In some examples, the cyberthreat level indicator may instead be based on a plurality of trigger criteria. For example, the cyberthreat level indicator may be a percentage indicating a percentage of trigger criteria that were identified as satisfied based on comparing the cyberthreat record to the trigger criteria.

The cyberthreat level indicator may indicate a likelihood of a cyberthreat affecting the application. For example, a higher cyberthreat level indicator may correspond to a greater likelihood of a cyberthreat affecting the application. For instance, a cyberthreat level indicator of 80%, indicating that, for example, four out of five trigger criteria were satisfied, may indicate a greater likelihood of a cyberthreat affecting an application than, for instance, a cyberthreat level indicator of 60%, indicating that three out of five trigger criteria were satisfied.

At step 212, the cyberthreat remediation platform 102 may compare the cyberthreat level indicator to a threshold value. The threshold value may be determined manually by a user (e.g., an employee of the enterprise organization associated with cyberthreat remediation platform 102), automatically by a ruleset programmed into the cyberthreat remediation platform 102, and/or by other means. The threshold value may indicate a level of cyberthreat beyond which remediation actions should be performed. The threshold value may be an integer, fraction, percentage, decimal, and/or other value. In comparing the cyberthreat level indicator to the threshold value the cyberthreat remediation platform 102 may identify whether the cyberthreat level indicator satisfies the threshold value. In some examples, a cyberthreat level indicator may satisfy the threshold value if it meets or exceeds the threshold value. For example, based on comparing a cyberthreat level indicator of, for example, 80% to a threshold value of, for example, 50%, the cyberthreat remediation platform 102 may identify that the cyberthreat level indicator satisfies the threshold value.

Based on comparing the cyberthreat level indicator to the threshold value and identifying that the cyberthreat level indicator satisfies the threshold value, the cyberthreat remediation platform 102 may proceed to step 213. Based on comparing the cyberthreat level indicator to the threshold value and identifying that the cyberthreat level indicator does not satisfy the threshold value, the cyberthreat remediation platform 102 may proceed to step 218 in FIG. 2E and update information of cyberthreats and vulnerabilities without performing the functions described below at steps 213-217.

Figure 2D:
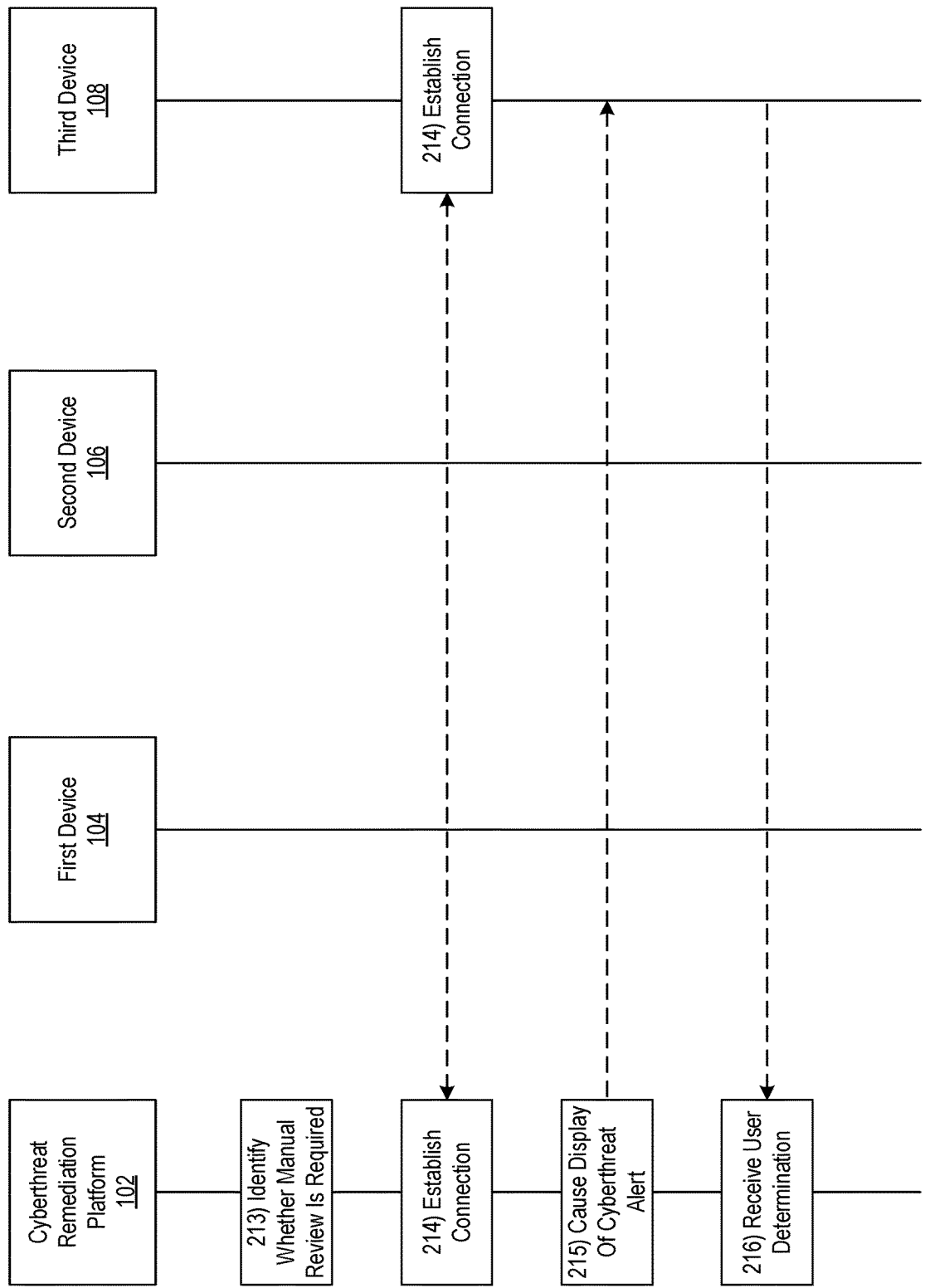

Referring to FIG. 2D, at step 213, based on comparing the cyberthreat level indicator to the threshold value and identifying that the cyberthreat level indicator satisfies the threshold value, the cyberthreat remediation platform 102 may identify whether manual review is required. For example, the cyberthreat remediation platform 102 may identify whether a manual review of the application and its associated cyberthreat record is required prior to performing remediation actions (e.g., penetration testing). In some examples, in identifying whether manual review is required, the cyberthreat remediation platform 102 may compare the cyberthreat level indicator to a second threshold value. The second threshold value may be determined manually by a user (e.g., an employee of the enterprise organization associated with cyberthreat remediation platform 102), a ruleset programmed into the cyberthreat remediation platform 102, and/or by other means. The second threshold value may indicate a level of cyberthreat beyond which manual review is not required to initiate remediation actions. The threshold value may be an integer, fraction, percentage, decimal, and/or other value. In comparing the cyberthreat level indicator to the threshold value the cyberthreat remediation platform 102 may identify whether the cyberthreat level indicator satisfies the threshold value. The second threshold value may be greater than the first threshold value. For example, the first threshold value (of step 212) may be 50%, and the second threshold value may be 70%. Accordingly, based on comparing a cyberthreat level indicator of 80% to the second threshold value, the cyberthreat remediation platform 102 may identify that the cyberthreat level indicator satisfies the second threshold value. Based on comparing a cyberthreat level indicator of 60% to the second threshold value, the cyberthreat remediation platform 102 may identify that the cyberthreat level indicator does not satisfy the second threshold value.

Figure 2E:
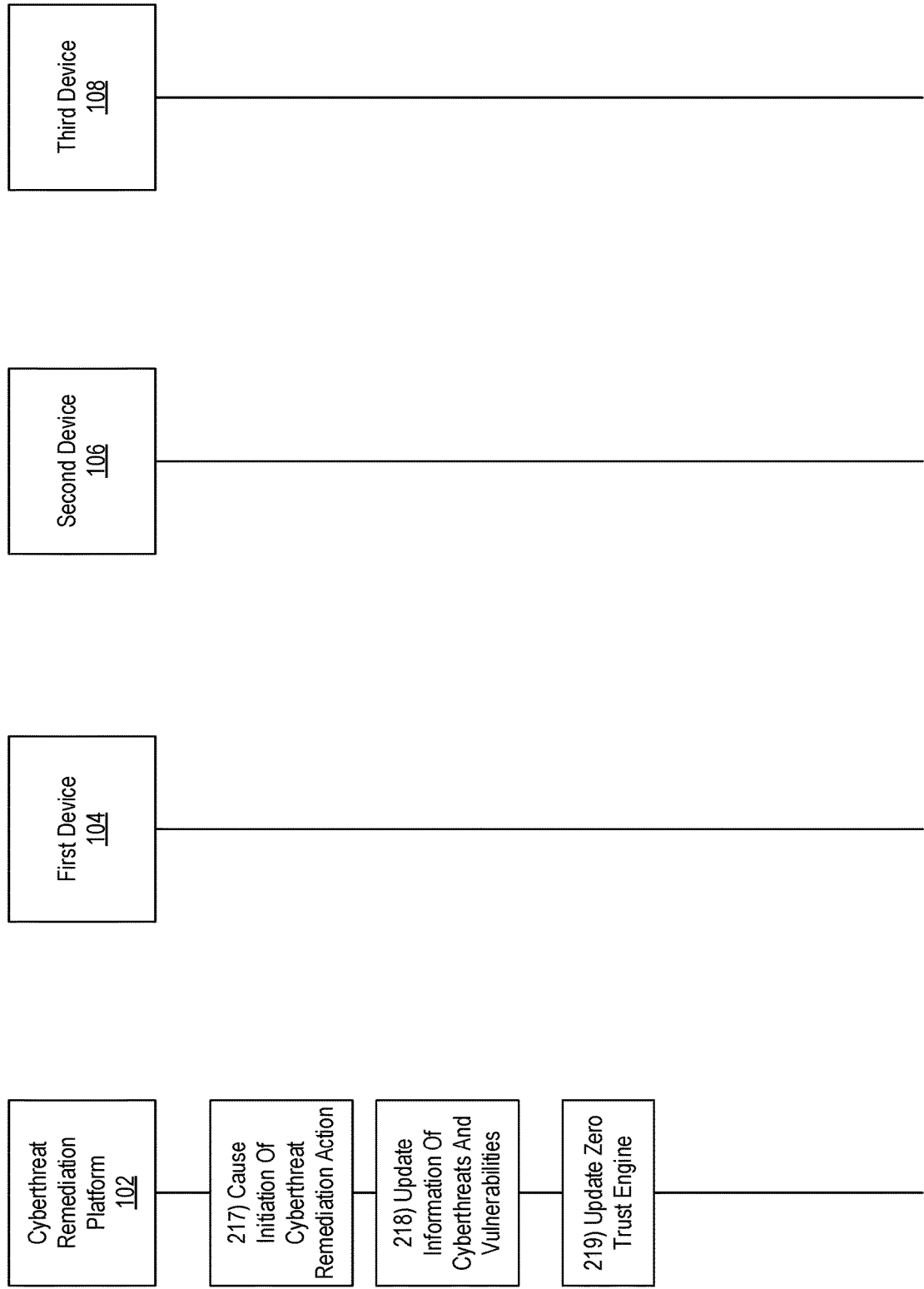

Based on comparing the cyberthreat level indicator to the second threshold value and identifying that the cyberthreat level indicator satisfies the second threshold value, the cyberthreat remediation platform 102 may identify that manual review is not necessary (e.g., based on the second threshold value indicating threshold beyond which manual review is not necessary) and proceed to step 217 in FIG. 2E to cause initiation of one or more remediation actions. Based on comparing the cyberthreat level indicator to the second threshold value and identifying that the cyberthreat level indicator does not satisfy the threshold value, the cyberthreat remediation platform 102 may proceed to initiate manual review as described below at steps 214-216.

At step 214, based on identifying that manual review of the application and cyberthreat record are necessary (e.g., as described at step 213), the cyberthreat remediation platform 102 may establish a connection with the third device 108. For example, the cyberthreat remediation platform 102 may establish a third wireless data connection with the third device 108 to link the third device 108 with the cyberthreat remediation platform 102 (e.g., in preparation for causing display of a user interface, receiving a user determination, and/or other functions). In some instances, the cyberthreat remediation platform 102 may identify whether or not a connection is already established with the third device 108. If a connection is already established with the third device 108, the cyberthreat remediation platform 102 might not re-establish the connection. If a connection is not yet established with the third device 108, the cyberthreat remediation platform 102 may establish the third wireless data connection as described above.

Figure 4A:
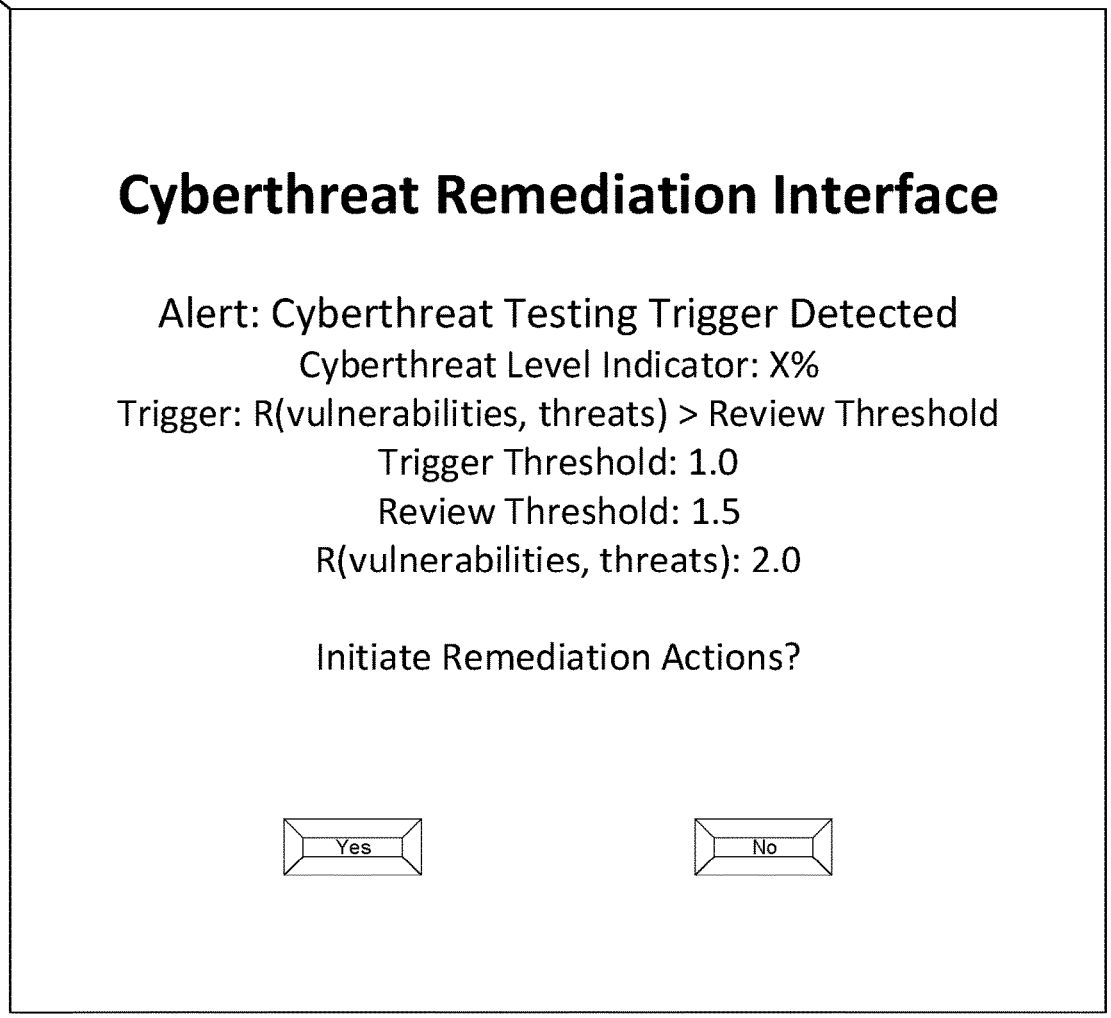
FIGS. 4A-4B depict illustrative graphical user interfaces depicting a cyberthreat alert interface and a cyberthreat remediation interface generated as part of cyberthreat remediation using a zero trust engine in accordance with one or more example arrangements.

At step 215, the cyberthreat remediation platform 102 may cause display of a user interface (e.g., a cyberthreat remediation interface, and/or other user interfaces) at the third device 108. For example, the cyberthreat remediation platform 102 may cause display of the user interface via the communication interface 113 and while the third wireless data connection is established. In causing display of the user interface, the cyberthreat remediation platform 102 may transmit and cause display of a cyberthreat remediation interface for performing manual review of a cyberthreat record for an application. In displaying the cyberthreat remediation interface, the cyberthreat remediation platform 102 may cause display of a graphical user interface similar to cyberthreat remediation interface 400, which is illustrated in FIG. 4A. For example, the cyberthreat remediation platform 102 may output one or more instructions (via the communication interface 113 and while the third wireless data connection is established) to the third device 108, causing the third device 108 to display the cyberthreat remediation interface 400.

Referring to FIG. 4A, in some instances, the cyberthreat remediation interface 400 may include information corresponding to the cyberthreat record of the application. For example, the cyberthreat remediation interface 400 may include information such as a notification that a cyberthreat testing trigger was detected (e.g., an alert that a trigger criteria was satisfied by the cyberthreat record), the cyberthreat level indicator, information of one or more trigger criteria that were satisfied by the cyberthreat record, an indication of the threshold values satisfied by the cyberthreat level indicator, and/or other information. The cyberthreat remediation interface 400 may also display interface elements or selectable options requesting user input. For example, the cyberthreat remediation interface 400 may display one or more of: an information entry field, a button or buttons, toggle or toggles, check box or boxes, and/or other interface elements. For example, as illustrated in FIG. 4A, the interface elements may be one or more buttons the user might toggle to initiate remediation actions. In some instances, based on user input/determinations of whether to initiate a remediation action (e.g., based on manual review, by an employee of the enterprise organization and/or other individual, of the cyberthreat record), the cyberthreat remediation platform 102 may receive the user input/determination at step 216 and, in some examples, cause initiation of the one or more remediation actions at step 217.

Referring back to FIG. 2D, at step 216, the cyberthreat remediation platform 102 may receive a user determination. For example, the cyberthreat remediation platform 102 may receive a user determination of whether to initiate remediation actions based on manual review of the cyberthreat record. The cyberthreat remediation platform 102 may receive the user determination as part of a transmission via the communication interface 113 and while the third wireless data connection is established.

Figure 4B:
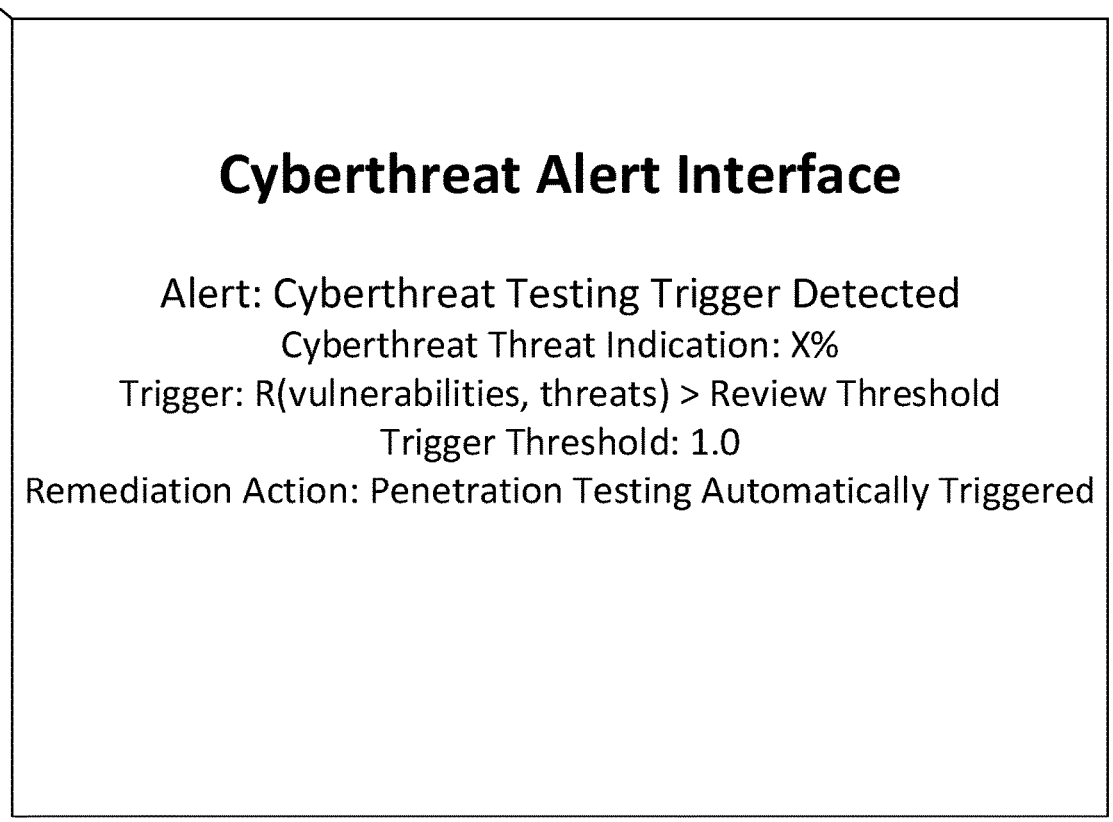

Referring to FIG. 2E, at step 217, the cyberthreat remediation platform 102 may cause initiation of one or more remediation actions. In some instances, the cyberthreat remediation platform 102 may cause initiation of the one or more remediation actions based on receiving a user determination initiating the one or more remediation actions. In some examples, the cyberthreat remediation platform 102 may cause initiation of the one or more remediation actions automatically without manual review (e.g., based on identifying that the cyberthreat indicator satisfies the threshold value of step 212 and the second threshold value of step 213). The one or more remediation actions may be and/or comprise one or more actions performed by the cyberthreat remediation platform 102 for resolving potential cyberthreats to the application associated with the cyberthreat record. For example, in some instances, the one or more remediation actions may include causing display of a cyberthreat alert interface to one or more user devices (e.g., the third device 108, and/or other user devices) that will alert users and/or systems to the risk of a cyberthreat. For example, the cyberthreat remediation platform 102 may cause display of the user interface via the communication interface 113 and while the third wireless data connection is established. In causing display of the cyberthreat alert interface, the cyberthreat remediation platform 102 may transmit and cause display of a graphical user interface similar to cyberthreat alert interface 410, which is illustrated in FIG. 4B. For example, the cyberthreat remediation platform 102 may output one or more instructions (via the communication interface 113 and while the third wireless data connection is established and/or while other wireless data connections are established) to the third device 108, and/or other user devices. Accordingly, the cyberthreat remediation platform 102 may cause the third device 108, and/or other user devices to display the cyberthreat alert interface 410.

Referring to FIG. 4B, in some instances, the cyberthreat alert interface 410 may include information corresponding to the cyberthreat record of the application. For example, the cyberthreat alert interface 410 may include information such as a notification that a cyberthreat testing trigger was detected (e.g., an alert that a trigger criteria was satisfied by the cyberthreat record), the cyberthreat level indicator, information of one or more trigger criteria that were satisfied by the cyberthreat record, an indication of the threshold values satisfied by the cyberthreat level indicator, an indication of the remediation action or actions that will be initiated by the cyberthreat remediation platform 102, and/or other information.

Referring again to FIG. 2E, at step 217, the one or more remediation actions may additionally or alternatively include identifying, based on the cyberthreat record, whether an associated cyberthreat of each vulnerability-cyberthreat pairing identified by the cyberthreat record is resolved. For example, the cyberthreat remediation platform 102 may initiate a vulnerability scan of the application to identify whether cyberthreats of the vulnerability-cyberthreat pairings have been resolved. For example, the cyberthreat remediation platform 102 may cause one or more devices (e.g., second device 106, and/or other devices) to perform one or more additional vulnerability scans as described at step 204. In some instances, based on the vulnerability scan, the cyberthreat remediation platform 102 may return to step 204 and repeat some or all of steps 204-216 as described herein.

Additionally or alternatively, in some examples, the one or more remediation actions may comprise performing penetration testing of the application associated with the cyberthreat record. Penetration testing may be and/or comprise one or more comprehensive tests and/or processes configured to resolve one or more cyberthreats (e.g., associated cyberthreats of the vulnerability-cyberthreat pairings of the cyberthreat record). Penetration testing may be and/or comprise manual review and/or automated computer program review of each cyberthreat associated with the cyberthreat record. Penetration testing may cause the one or more cyberthreats to be resolved. For example, based on a cyberthreat indicating that two-factor authentication should be implemented with the application, the cyberthreat remediation platform 102 may cause, by and/or as a result of penetration testing, two-factor authentication to be implemented with the application.

In some examples, in causing initiation of the one or more remediation actions, the cyberthreat remediation platform 102 may cause one or more computing components and/or computing devices different from the cyberthreat remediation platform 102 to initiate the one or more remediation actions. For example, the cyberthreat remediation platform 102 may cause a device (e.g., third device 108, and/or other devices) to perform penetration testing (e.g., by sending one or more instructions, alerts, notifications, or the like to the third device 108 and/or other devices). Based on causing initiation of the one or more remediation actions, the cyberthreat remediation platform 102 may update information of cyberthreats and vulnerabilities (e.g., as described at step 218) based on penetration testing results, updated cyberthreat modeling information, updated vulnerability scanning information, and/or other information At step 218, the cyberthreat remediation platform 102 may update the information of cyberthreats and vulnerabilities. In some examples, the cyberthreat remediation platform 102 may update the information of cyberthreats and vulnerabilities based on causing initiation of the one or more remediation actions of step 217. In some instances, the cyberthreat remediation platform 102 may update the information of cyberthreats and vulnerabilities based on identifying that the cyberthreat level indicator does not satisfy the threshold value and that remediation actions are not necessary for the application associated with the cyberthreat record at the instant time. In updating the information of cyberthreats and vulnerabilities, the cyberthreat remediation platform 102 may cause one or more computing components and/or devices (e.g., computing components of the cyberthreat remediation platform 102, the first device 104, the second device 106, and/or other devices) to perform cyberthreat modeling and/or vulnerability scanning (e.g., as described at steps 202 and 204). Additionally or alternatively, in updating the information of cyberthreats and vulnerabilities, the cyberthreat remediation platform 102 may receive information of cyberthreats and/or vulnerabilities from one or more devices (e.g., first device 104, second device 106, one or more developer devices, and/or other devices) based on the one or more devices automatically performing cyberthreat modeling and/or vulnerability scanning as a result of the one or more remediation actions. Based on the cyberthreat modeling and/or vulnerability scanning, and/or based on receiving information of cyberthreats and/or vulnerabilities from one or more devices, the cyberthreat remediation platform 102 may identify whether new cyberthreats and/or new vulnerabilities not previously included in the information of cyberthreats and vulnerabilities of step 205 were detected by the cyberthreat modeling and/or vulnerability scanning and add the new cyberthreats and/or new vulnerabilities to the information of cyberthreats and vulnerabilities. Additionally or alternatively, based on cyberthreat modeling information and/or vulnerability information, the cyberthreat remediation platform 102 may identify whether any cyberthreats and/or vulnerabilities previously tagged as "open" have been closed (e.g., based on causing initiation of the one or more remediation actions of step 217) and update the information of cyberthreats and vulnerabilities of step 205 accordingly. Additionally or alternatively, in some instances, the cyberthreat remediation platform 102 may update the information of cyberthreats and vulnerabilities based on identifying whether the cyberthreat level indicator satisfies the threshold value of step 212. For example, the cyberthreat remediation platform 102 may store a correlation, electronic flag, and/or other indication of whether the cyberthreat level indicator satisfied the threshold value of step 212. In some examples, the cyberthreat remediation platform 102 may use the updated information of cyberthreats and vulnerabilities to update one or more machine learning models that may, for example, have been trained by the zero trust engine. In these examples, the cyberthreat remediation platform 102 may proceed to step 219 to update the one or more machine learning models. In some instances, the cyberthreat remediation platform 102 may not use the updated information of cyberthreats and vulnerabilities to update one or more machine learning models (e.g., in one or more examples where the zero trust engine does not use machine learning models to perform any of the functions described herein) and may not proceed to step 219.

At step 219, the cyberthreat remediation platform 102 may update the zero trust engine. In updating the zero trust engine, the cyberthreat remediation platform 102 may cause the zero trust engine to refine, validate, and/or otherwise update the zero trust model. For example, the cyberthreat remediation platform 102 may cause the zero trust engine to update the zero trust model based on the updated information of cyberthreats and vulnerabilities. In some instances, updating the zero trust model may include inputting the updated information of cyberthreats and vulnerabilities into the zero trust model. By inputting the updated information of the cyberthreats and vulnerabilities into the zero trust model, the cyberthreat remediation platform 102 may create an iterative feedback loop that may continuously and dynamically refine the zero trust model to improve its accuracy. For example, based on inputting the updated information of cyberthreats and vulnerabilities into the zero trust model, the cyberthreat remediation platform 102 may cause the zero trust model to store and/or update one or more stored between cyberthreats and vulnerabilities for future iterations of the feedback loop. For example, based on updated cyberthreat and vulnerability information indicating that one or more cyberthreats were resolved (based on, for example, initiating one or more cyberthreat remediation actions), the cyberthreat remediation platform 102 may cause the zero trust model to delete/remove a correlation between the resolved cyberthreat and one or more vulnerabilities, for use in generating cyberthreat mappings in future iterations of the feedback loop.

In updating the zero trust model, the cyberthreat remediation platform 102 may remove redundant correlations and/or maintain a set of relevant correlations for each cyberthreat, which may, e.g., result in more efficient training of machine learning models trained by the zero trust engine (and may in some instances, conserve computing and/or processing power/resources in doing so).

Figure 5:
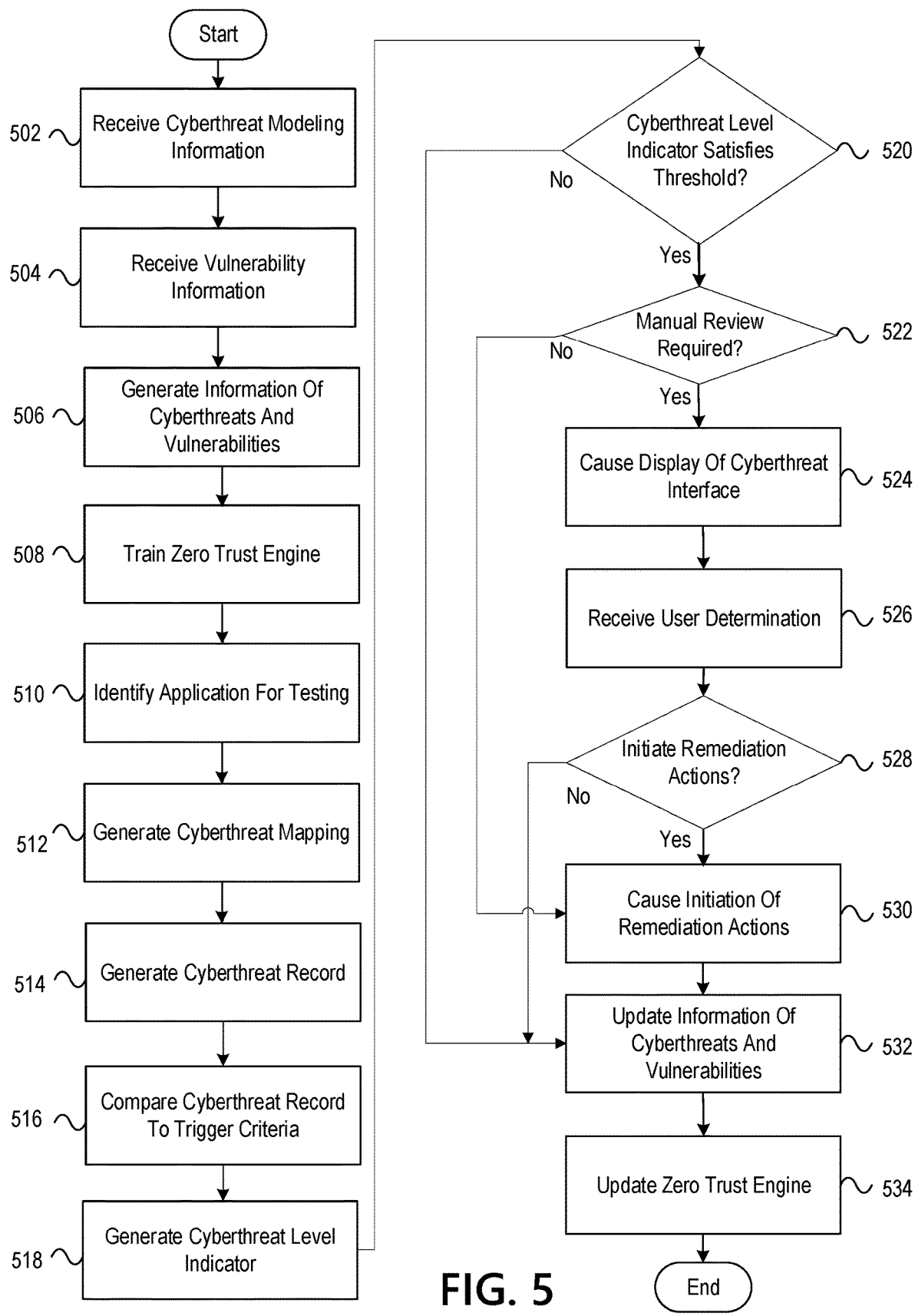
FIG. 5 depicts an illustrative method for cyberthreat remediation using a zero trust engine in accordance with one or more example arrangements.

FIG. 5 depicts an illustrative method for cyberthreat remediation using a zero trust engine in accordance with one or more example arrangements. Referring to FIG. 5, at step 502, a computing platform having at least one processor, a communication interface, and memory may model receive cyberthreat modeling information. For example, the computing platform may receive cyberthreat modeling information generated via cyberthreat modeling tools and/or programs. At step 504, the computing platform may receive vulnerability scanning information. For example, the computing platform may receive the vulnerability scanning information based on scanning for vulnerabilities associated with cyberthreats and/or based on receiving vulnerability scanning information from one or more additional devices. At step 506, the computing platform may generate information of cyberthreats and vulnerabilities based on information of cyberthreats and vulnerabilities. At step 508, the computing platform may train a zero trust engine. For example, the computing platform may train and/or configure a zero trust engine to generate cyberthreat mappings and cyberthreat records for applications corresponding to a network. In training and/or configuring the zero trust engine, the computing platform may cause the zero trust engine to train one or more machine learning models (e.g., zero trust models) to generate the cyberthreat mappings. At step 510, the computing platform may identify an application for cyberthreat testing. At step 512, the computing platform may generate a cyberthreat mapping for the application based on a subset of the information of cyberthreats and vulnerabilities. For example, the computing platform may generate the cyberthreat mapping based on inputting the subset of the information of cyberthreats and vulnerabilities into a zero trust model. At step 514, the computing platform may generate a cyberthreat record based on the cyberthreat mapping. For example, the computing platform may generate a cyberthreat record (e.g., a zero trust table, and/or other cyberthreat records) using the zero trust engine. At step 516, the computing platform may compare the cyberthreat record to one or more trigger criteria (e.g., using one or more algorithms defined to identify risks and divergences between cyberthreats and vulnerabilities). Based on comparing the cyberthreat record to the one or more trigger criteria, at step 518, the computing platform may generate a cyberthreat level indicator for the application.

At step 520, the computing platform may identify whether the cyberthreat level indicator satisfies a threshold. For example, the computing platform may identify whether the cyberthreat level indicator satisfies a threshold by comparing the cyberthreat level indicator to a threshold value. Based on identifying that the cyberthreat level indicator does not satisfy the threshold, the computing platform may proceed to step 532. Based on identifying that the cyberthreat level indicator does satisfy the threshold, the computing platform may proceed to step 522. At step 522, based on identifying that the cyberthreat level indicator does satisfy the threshold value, the computing platform may identify whether manual review is required to initiate one or more remediation actions. For example, the computing platform may identify whether manual review is required to initiate one or more remediation actions based on comparing the cyberthreat level indicator to a second threshold value. Based on identifying that manual review is not required, the computing platform may proceed to step 530. Based on identifying that manual review is required, the computing platform may proceed to step 524. At step 524, based on identifying that manual review is required, the computing platform my cause display of a cyberthreat interface. For example, the computing platform may cause display of a cyberthreat remediation interface for manual review. At step 526, the computing platform may receive a user determination of whether to initiate remediation actions. At step 528, the computing platform may identify whether the user determination indicates remediation actions should be initiated. Based on identifying that the user determination indicates remediation actions should not be initiated, the computing platform may proceed to step 532. Based on identifying that the user determination indicated remediation actions should be remediated, the computing platform may proceed to step 530. At step 530, based on identifying that the user determination indicated remediation actions should be remediated and/or based on identifying that manual review is not required, the computing platform may cause initiation of one or more remediation actions. At step 532, the computing platform may update the information of cyberthreats and vulnerabilities. At step 534, the computing platform may update the zero trust engine. In updating the zero trust engine, the computing platform may cause the zero trust engine to update one or more machine learning models.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, configure the computing platform to:
   receive, based on cyberthreat modeling and vulnerability scanning of one or more applications corresponding to a network, information of cyberthreats and vulnerabilities corresponding to the one or more applications;
   train, based on the information of cyberthreats and vulnerabilities, a zero trust model, wherein training the zero trust model configures the zero trust model to generate cyberthreat mappings for applications based on input of information of cyberthreats and vulnerabilities;
   identify, based on one or more parameters, a first application, of the one or more applications, for cyberthreat testing;
   generate, based on a subset of information, of the information of cyberthreats and vulnerabilities and corresponding to the first application, a cyberthreat mapping for the first application, wherein the cyberthreat mapping comprises a plurality of vulnerability-cyberthreat pairings and wherein the generating the cyberthreat mapping is further based on inputting the subset of information into the zero trust model;
   generate, based on the cyberthreat mapping, a cyberthreat record, wherein the cyberthreat record comprises a representation of the cyberthreat mapping;
   generate, by comparing the cyberthreat record to one or more trigger criteria, a cyberthreat level indicator for the first application, wherein the cyberthreat level indicator indicates a likelihood of a cyberthreat affecting the first application;
   identify, by comparing the cyberthreat level indicator to a threshold, whether the cyberthreat level indicator satisfies the threshold;
   initiate, based on identifying that the cyberthreat level indicator satisfies the threshold, one or more cyberthreat remediation actions for the application;
   update, based on identifying whether the cyberthreat level indicator satisfies the threshold, the information of cyberthreats and vulnerabilities; and
   update, based on the updated information of cyberthreats and vulnerabilities, the zero trust model.

2. The computing platform of claim 1, wherein the updating the zero trust model is further based on the initiating the one or more cyberthreat remediation actions.

3. The computing platform of claim 1, wherein the cyberthreat modeling comprises identifying, based on a design of the first application, one or more potential cyberthreats to the network and the vulnerability scanning comprises identifying whether the one or more potential cyberthreats are resolved.

4. The computing platform of claim 1, wherein the identifying the first application for cyberthreat testing comprises:
   identifying whether a threshold amount of time corresponding to cyberthreat testing of the first application is satisfied, or
   identifying whether an update time corresponding to the first application antedates a cyberthreat testing time corresponding to the first application.

5. The computing platform of claim 1, wherein the trigger criteria comprises one or more of:
   a ratio of incorrectly closed cyberthreats to correctly closed cyberthreats,
   a negative divergence between vulnerability scans of the first application, or
   a divergence between a ratio of unverified cyberthreats and a ratio of verified cyberthreats.

6. The computing platform of claim 1, wherein the memory stores additional computer-readable instructions that, when executed by the at least one processor, further configure the computing platform to:
   cause, based on identifying that the cyberthreat level indicator satisfies the threshold and prior to the initiating the one or more cyberthreat remediation actions, display of a cyberthreat remediation interface.

7. The computing platform of claim 1, wherein the one or more cyberthreat remediation actions comprise one or more of:
   identifying, for each of the plurality of vulnerability-cyberthreat pairings, whether an associated cyberthreat is resolved, or
   resolving, based on the plurality of vulnerability-cyberthreat pairings, one or more cyberthreats.

8. A method comprising:
   at a computing device comprising at least one processor, a communication interface, and memory:
   receiving, based on cyberthreat modeling and vulnerability scanning of one or more applications corresponding to a network, information of cyberthreats and vulnerabilities corresponding to the one or more applications;
   training, based on the information of cyberthreats and vulnerabilities, a zero trust model, wherein training the zero trust model configures the zero trust model to generate cyberthreat mappings for applications based on input of information of cyberthreats and vulnerabilities;
   identifying, based on one or more parameters, a first application, of the one or more applications, for cyberthreat testing;
   generating, based on a subset of information, of the information of cyberthreats and vulnerabilities and corresponding to the first application, a cyberthreat mapping for the first application, wherein the cyberthreat mapping comprises a plurality of vulnerability-cyberthreat pairings and wherein the generating the cyberthreat mapping is based on inputting the subset of information into the zero trust model;
   generating, based on the cyberthreat mapping, a cyberthreat record, wherein the cyberthreat record comprises a representation of the cyberthreat mapping;
   generating, by comparing the cyberthreat record to one or more trigger criteria, a cyberthreat level indicator for the first application, wherein the cyberthreat level indicator indicates a likelihood of a cyberthreat affecting the first application;

identifying, by comparing the cyberthreat level indicator to a threshold, whether the cyberthreat level indicator satisfies the threshold;
initiating, based on identifying that the cyberthreat level indicator satisfies the threshold, one or more cyberthreat remediation actions for the application;
updating, based on identifying whether the cyberthreat level indicator satisfies the threshold, the information of cyberthreats and vulnerabilities; and
updating, based on the updated information of cyberthreats and vulnerabilities, the zero trust model.

9. The method of claim 8, wherein the updating the zero trust model is further based on the initiating the one or more cyberthreat remediation actions.

10. The method of claim 8, wherein the cyberthreat modeling comprises identifying, based on a design of the first application, one or more potential cyberthreats to the network and the vulnerability scanning comprises identifying whether the one or more potential cyberthreats are resolved.

11. The method of claim 8, wherein the identifying the first application for cyberthreat testing comprises:
identifying whether a threshold amount of time corresponding to cyberthreat testing of the first application is satisfied, or
identifying whether an update time corresponding to the first application antedates a cyberthreat testing time corresponding to the first application.

12. The method of claim 8, further comprising:
cause, based on identifying that the cyberthreat level indicator satisfies the threshold and prior to the initiating the one or more cyberthreat remediation actions, display of a cyberthreat remediation interface.

13. The method of claim 8, wherein the trigger criteria comprises one or more of:
a ratio of incorrectly closed cyberthreats to correctly closed cyberthreats,
a negative divergence between vulnerability scans of the first application, or
a divergence between a ratio of unverified cyberthreats and a ratio of verified cyberthreats.

14. The method of claim 8, wherein the one or more cyberthreat remediation actions comprise one or more of:
identifying, for each of the plurality of vulnerability-cyberthreat pairings, whether an associated cyberthreat is resolved, or
resolving, based on the plurality of vulnerability-cyberthreat pairings, one or more cyberthreats.

15. One or more non-transitory computer-readable media storing instructions that, when executed by a computing platform comprising at least one processor, a communication interface, and memory, cause the computing platform to:
receive, based on cyberthreat modeling and vulnerability scanning of one or more applications corresponding to a network, information of cyberthreats and vulnerabilities corresponding to the one or more applications;
train, based on the information of cyberthreats and vulnerabilities, a zero trust model, wherein training the zero trust model configures the zero trust model to generate cyberthreat mappings for applications based on input of information of cyberthreats and vulnerabilities;
identify, based on one or more parameters, a first application, of the one or more applications, for cyberthreat testing;
generate, based on a subset of information, of the information of cyberthreats and vulnerabilities and corresponding to the first application, a cyberthreat mapping for the first application, wherein the cyberthreat mapping comprises a plurality of vulnerability-cyberthreat pairings and wherein the generating the cyberthreat mapping is based on inputting the subset of information into the zero trust model;
generate, based on the cyberthreat mapping, a cyberthreat record, wherein the cyberthreat record comprises a representation of the cyberthreat mapping;
generate, by comparing the cyberthreat record to one or more trigger criteria, a cyberthreat level indicator for the first application, wherein the cyberthreat level indicator indicates a likelihood of a cyberthreat affecting the first application;
identify, by comparing the cyberthreat level indicator to a threshold, whether the cyberthreat level indicator satisfies the threshold;
initiate, based on identifying that the cyberthreat level indicator satisfies the threshold, one or more cyberthreat remediation actions for the application;
update, based on identifying whether the cyberthreat level indicator satisfies the threshold, the information of cyberthreats and vulnerabilities; and
update, based on the updated information of cyberthreats and vulnerabilities, the zero trust model.

16. The one or more non-transitory computer-readable media of claim 15, wherein the updating the zero trust model is further based on the initiating the one or more cyberthreat remediation actions.

17. The one or more non-transitory computer-readable media of claim 15, wherein the cyberthreat modeling comprises identifying, based on a design of the first application, one or more potential cyberthreats to the network and the vulnerability scanning comprises identifying whether the one or more potential cyberthreats are resolved.

18. The one or more non-transitory computer-readable media of claim 15, wherein the identifying the first application for cyberthreat testing comprises:
identifying whether a threshold amount of time corresponding to cyberthreat testing of the first application is satisfied, or
identifying whether an update time corresponding to the first application antedates a cyberthreat testing time corresponding to the first application.

19. The one or more non-transitory computer-readable media of claim 15, storing instructions that, when executed, further cause the computing platform to:
cause, based on identifying that the cyberthreat level indicator satisfies the threshold and prior to the initiating the one or more cyberthreat remediation actions, display of a cyberthreat remediation interface.

20. The one or more non-transitory computer-readable media of claim 15, wherein the trigger criteria comprises one or more of:
a ratio of incorrectly closed cyberthreats to correctly closed cyberthreats,
a negative divergence between vulnerability scans of the first application, or
a divergence between a ratio of unverified cyberthreats and a ratio of verified cyberthreats.

* * * * *